(12) United States Patent
Rossano et al.

(10) Patent No.: US 9,237,427 B2
(45) Date of Patent: Jan. 12, 2016

(54) METHODS AND SYSTEMS FOR TRANSMITTING VIDEO MESSAGES TO MOBILE COMMUNICATION DEVICES

(71) Applicant: MOBILE MESSENGER GLOBAL, INC., Los Angeles, CA (US)

(72) Inventors: Anthony Rossano, Seattle, WA (US); James Citron, Santa Monica, CA (US); Norman Schifman, Pacific Palisades, CA (US)

(73) Assignee: MOBILE MESSENGERS GLOBAL, INC., Los Angeles, CA (US)

( * ) Notice: Subject to any disclaimer, the term of this patent is extended or adjusted under 35 U.S.C. 154(b) by 0 days.

(21) Appl. No.: 14/599,268

(22) Filed: Jan. 16, 2015

(65) Prior Publication Data

US 2015/0312732 A1    Oct. 29, 2015

Related U.S. Application Data

(63) Continuation of application No. 13/891,991, filed on May 10, 2013, now Pat. No. 9,030,521, which is a continuation of application No. 12/334,245, filed on Dec. 12, 2008, now Pat. No. 8,457,661.

(60) Provisional application No. 61/013,205, filed on Dec. 12, 2007, provisional application No. 61/013,231, filed on Dec. 12, 2007, provisional application No. 61/013,213, filed on Dec. 12, 2007.

(51) Int. Cl.
  *H04N 7/14* (2006.01)
  *H04W 4/12* (2009.01)
  *H04L 12/58* (2006.01)

(52) U.S. Cl.
  CPC ................ *H04W 4/12* (2013.01); *H04L 51/10* (2013.01); *H04L 51/38* (2013.01)

(58) Field of Classification Search
  CPC combination set(s) only.
  See application file for complete search history.

(56) References Cited

U.S. PATENT DOCUMENTS

| | | |
|---|---|---|
| 7,193,644 B2 | 3/2007 | Carter |
| 7,961,212 B2 | 6/2011 | Woodworth et al. |
| 2006/0008256 A1 | 1/2006 | Khedouri et al. |
| 2006/0120404 A1 | 6/2006 | Sebire et al. |
| 2006/0232663 A1 | 10/2006 | Gandhi et al. |
| 2007/0058681 A1 | 3/2007 | Bettis et al. |
| 2007/0107044 A1 | 5/2007 | Yuen et al. |
| 2007/0213030 A1 | 9/2007 | Benco et al. |
| 2007/0265006 A1 | 11/2007 | Washok et al. |
| 2008/0057987 A1 | 3/2008 | Landschaft et al. |
| 2008/0071875 A1 | 3/2008 | Koff et al. |

(Continued)

*Primary Examiner* — Joseph J Nguyen
*Assistant Examiner* — Phung-Hoang J. Nguyen
(74) *Attorney, Agent, or Firm* — Arent Fox LLP

(57) ABSTRACT

Methods and systems for managing messaging are described. An illustrative messaging system includes a processor and a content database storing video content and/or other content, and a user database that stores an identifier corresponding to a telecommunications carrier associated with a user mobile phone, and an indicator indicating the messaging capability of the mobile phone of the user. Code is stored in memory that is configured to provide for display on a terminal a faun via which a user can view a plurality of videos from the content database, select a video to be sent as a message, and specify a recipient for the video message. The system is optionally configured to initiate the transmission of an approval request message to a terminal, such as a mobile phone associated with the user, wherein the user can approve the sending of the video message to the recipient by taking an action in response to the approval request.

11 Claims, 18 Drawing Sheets

(56) References Cited

U.S. PATENT DOCUMENTS

| | | |
|---|---|---|
| 2008/0072261 A1 | 3/2008 | Ralston et al. |
| 2008/0086431 A1 | 4/2008 | Robinson et al. |
| 2008/0214148 A1 | 9/2008 | Ramer et al. |
| 2008/0214152 A1 | 9/2008 | Ramer et al. |
| 2008/0214204 A1 | 9/2008 | Ramer et al. |
| 2008/0215428 A1 | 9/2008 | Ramer et al. |
| 2008/0215623 A1 | 9/2008 | Ramer et al. |
| 2008/0242279 A1 | 10/2008 | Ramer et al. |
| 2008/0270220 A1 | 10/2008 | Ramer et al. |
| 2008/0275881 A1 | 11/2008 | Conn et al. |
| 2008/0281971 A1 | 11/2008 | Leppanen et al. |
| 2008/0293387 A1 | 11/2008 | Conn et al. |
| 2009/0006975 A1 | 1/2009 | Salim et al. |
| 2009/0066781 A1 | 3/2009 | Jackson et al. |

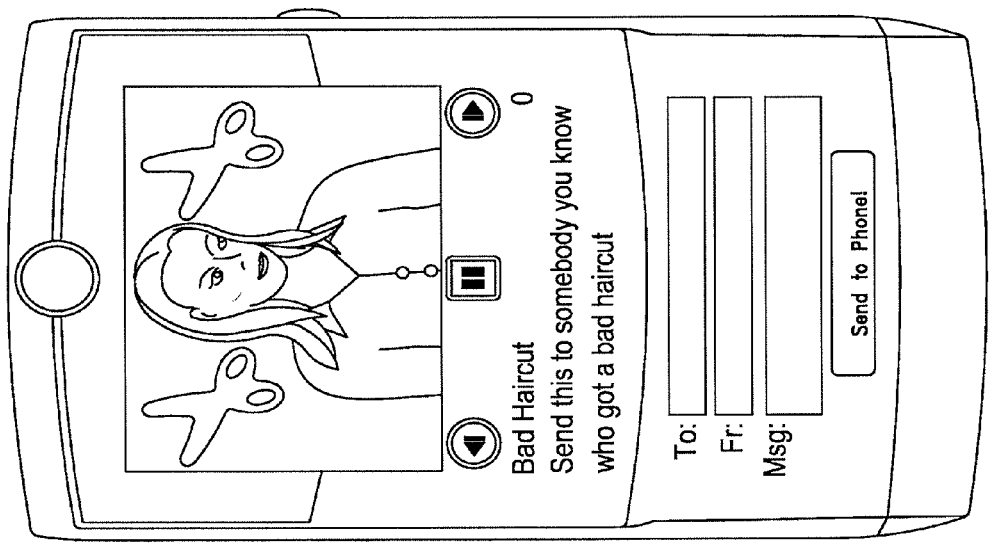

METHODS AND SYSTEMS FOR TRANSMITTING VIDEO MESSAGES TO MOBILE COMMUNICATION DEVICES

PRIORITY CLAIM

Cross-Reference to Related Applications

The present application claims priority from U.S. Patent Application Nos. 61/013,213; 61/013,231; 61/013,205, all filed Dec. 12, 2007, the contents of which are incorporated herein in its entirety.

This application is related to U.S. patent application Ser. No. 12/333,768, entitled Methods and Systems for Video Messaging, filed on the same day as the present application, the content of which is incorporated herein by reference in its entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

COPYRIGHT RIGHTS

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

DESCRIPTION OF THE RELATED ART

Communication systems, and in particular, mobile phones are increasingly networked. However, there is as yet no satisfactory way for users to take adequately take advantage of such networked phones.

SUMMARY OF THE INVENTION

Systems and methods of creating, transmitting, and receiving messages, optionally including video and text, are described herein.

In certain example embodiments, a user selects content, such as by way of example video content, designates a destination for the content, and a processor-based message processing system then transmits the content to the designated destination/recipient. By way of example, the destination can be a mobile phone, an email address, a webpage and/or other destination.

Optionally, the user is charged for providing the video to the recipient (specific to the video as opposed to a general communication charge). Optionally, the user's telecommunications carrier charges the user for the video use. Optionally, the user has a subscription for sending video messages.

Optionally, prior to the video being transmitted to the recipient, a confirmation/authorization request is transmitted to the user. For example, the confirmation/authorization request may be sent to the user's mobile phone (e.g., as an SMS message, an MMS message, an email, or otherwise). The user then needs to talce an action to confirm/authorize transmission of the message. For example, the user may need to transmit an SMS message, an email message, or take other action to authorize transmission of the message.

Optionally, in addition or instead, the user can specify a subject of interest on which they want to receive notifications (e.g., video notification). By way of example and not limitation, the user can specify one or more of: a specific person (e.g., an actor, a musician, a celebrity, a politician, etc.), a title associated with a person (e.g., President of the United States), a musical group, a sports team, a political body (e.g., Congress), a vehicle, a city, a state, an item of natural geography (e.g., oceans generally, or a specific ocean by name), a weather condition, etc. Optionally, a user interface is provided that includes fields/controls via which the user can specify the media-type that is to be transmitted to the user (e.g., one or more of videos, audio tracks, photographs, text, etc.) and any limitation on format and/or size.

An example embodiment provides a video messaging system comprising: a processor; a content database that stores video content; a user database—that stores: a user identifier associated with at least one user; an identifier corresponding to a telecommunications carrier associated with a mobile phone of the at least one user; an indicator indicating the messaging capability of the mobile phone of the at least one user; a telephone number associated with the mobile phone of the at least one user; program code stored in computer readable memory that when executed by the processor is configured to: provide for display on a user terminal a form via which a user can view a plurality of available videos from the content database, view an amount associated with sending the video, select a video to be sent as a message, specify a recipient for the video message, enter text to be sent to the recipient in association with the selected video, and instruct that the selected video and the text be sent as a message to the specified recipient; receive and store in computer readable memory the user video selection, the recipient specification, and the text; initiate the transmission of an approval request message to a mobile phone associated with the user using the phone number associated with the user mobile phone to address the approval request message, wherein the user can approve the sending of the video message to the recipient by taking an action in response to the approval request; if the user approves sending of the video message within a specified period of time: initiate the transmission of the video message and associated text to a mobile phone associated with the recipient; identify the video message as being in an active state at least until a confirmation of receipt indication is received via a carrier associated with the recipient; if a confirmation is received, store the confirmation in computer readable memory; and if the user does not approve sending of the video message within the specified time period, initiating the cancellation of the transmission the video message to the recipient.

An example embodiment provides a method of transmitting video messages to a mobile phone, the method comprising: receiving over a network from a user terminal an identification of a message recipient, wherein the message recipient is associated with a mobile phone, text to be included in a message, and selection of video content to be included in the message: creating a message object corresponding to the message and storing the message object in computer readable memory; accessing a data store to determine what campaign the message is entitled to, wherein the campaign indicates if the user is to be charged on a per message basis; identifying a telecommunications carrier associated a user telephonic device; if a determination is made that the user is to be charged on a per message basis for the message: at least partly in response to the determination that the user is to be charged on a per message basis for the message, causing, at least in part, an authorization notification to be transmitted to the user's telephonic device, wherein the authorization notification indicates that the user needs to provide authorization for the video message to be sent; if an indication is received within a first period of time that the user has provided authorization for the message to be sent: initiating the transmission of the message to the recipient's mobile phone; and determining if a transmission confirmation is received with a second period of time, and if the transmission confirmation is not received with the second period of time, storing a successful delivery indication in memory, and if the transmission confirmation is not received with the second period of time, storing a delivery failure indication in memory.

An example embodiment provides a method of transmitting video messages to a mobile phone, the method comprising: receiving over a network at a message management system a request from a user that a video message be sent to a recipient mobile phone; transmitting an authorization request message to a mobile phone associated with the user, wherein the user needs to provide a user authorization response in order for the video message to be sent to the recipient; and at least partly in response to receiving an authorization response from the user, initiating the transmission of the video message to the recipient mobile phone.

An illustrative messaging system includes a processor and a content database storing video content and/or other content, and a user database that stores an identifier corresponding to a telecommunications carrier associated with a user mobile phone, and an indicator indicating the messaging capability of the mobile phone of the user. Code is stored in memory that is configured to provide for display on a terminal a form via which a user can view a plurality of videos from the content database, select a video to be sent as a message, and specify a recipient for the video message. The system is optionally configured to initiate the transmission of an approval request message to a terminal, such as a mobile phone associated with the user, wherein the user can approve the sending of the video message to the recipient by taking an action in response to the approval request.

BRIEF DESCRIPTION OF THE DRAWINGS

Embodiments will now be described with reference to the drawings summarized below. These drawings and the associated description are provided to illustrate example embodiments, and not to limit the scope of the invention.

FIGS. 8A, 8B, 9A, 9B, 10 and 11 illustrate additional example messaging application user interfaces.

DETAILED DESCRIPTION OF PREFERRED EMBODIMENTS

Figure 1:
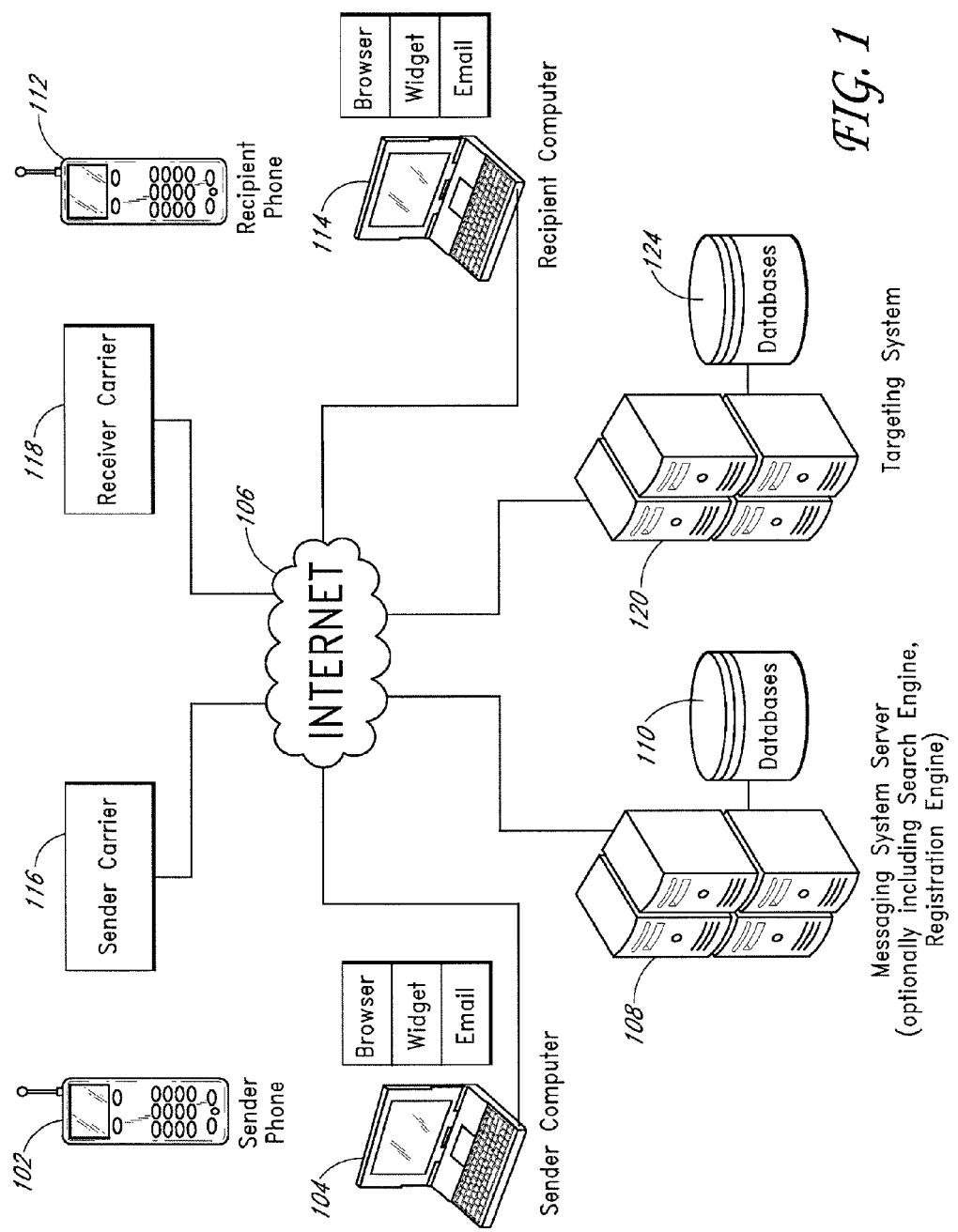
FIG. 1 illustrates an example messaging environment.

Systems and methods of creating, transmitting, and receiving messages, optionally including video and text, are described herein.

Throughout the following description, the term "Web site" is used to refer to a user-accessible network site that implements the basic World Wide Web standards for the coding and transmission of hypertextual documents. These standards currently include HTML (the Hypertext Markup Language), HTTP (the Hypertext Transfer Protocol), JavaScript, JSON, and XML. It should be understood that the term "site" is not intended to imply a single geographic location, as a Web or other network site can, for example, comprise multiple geographically distributed computer systems that are appropriately linked together.

Furthermore, while the following description relates to an embodiment utilizing the Internet and related protocols, other networks and other protocols may be used as well. In addition, unless otherwise indicated, the functions described herein may be performed by executable code and instructions running on one or more computers (e.g., general-purpose or specialized computers). For example, program code stored in non-volatile and/or volatile memory can include one or more instructions, which can optionally be straight-line code and/or organized as modules or objects configured to receive and process inputs, provide outputs, and to selectively store data. However, the present invention can also be implemented using special purpose computers, state machines, and/or hardwired electronic circuits. While certain example processes are described herein, not all the process states need to be performed, and the order of the process can be varied. While reference may be made to certain databases, the information can optionally be stored in a single database, more databases, or other number of databases or other data stores. Further, while reference may be made to services and functionality provided by a various parties, optionally all of the services may be provided by a single party or other number of parties. While references may be made to videos, it is understood that a video optionally includes an audio track as well.

While certain example embodiments discuss using MMS (Multimedia Messaging Service) messaging or SMS (Short Message Service) WAP (Wireless Application Protocol) push for transmitting video messages or links to video messages other messaging standards can be used.

In an example embodiment, a video messaging system includes a one or more databases.

For example, a content database ("clips") storing video clips and other content that can be sent as part of a message, can include one or more of the following record fields to store corresponding information name ("clip_db");

version ("versions"), which can be used to identify the version when there are different versions of a given clip (e.g., different lengths, lighting, script, etc.). For example, a first version of a clip may include an advertisement or product placement within the clip for a first advertiser, and a second version of the clip may include an advertisement or product placement within the second version of the clip for a second advertiser. By way of further example, for a given version for an advertiser, there may be "sub-versions" for different handsets, and/or sub-versions for a handset and for a web page, etc. Fields may also be provided for performer/participant (which can be used to store the name(s) of the person (people) appearing in the video clip (although this type of information may instead or in addition be stored in a 'tags" field), for the author (which may be the owner of the clip for royalty purposes), for the price for sending the clip, etc.;

people, which can be used to store the name(s) of the person (people) appearing in the video clip (e.g., where the person in the script may be a well known actors musician, athlete, celebrity, politician, etc.);

price.

Figure 6A:
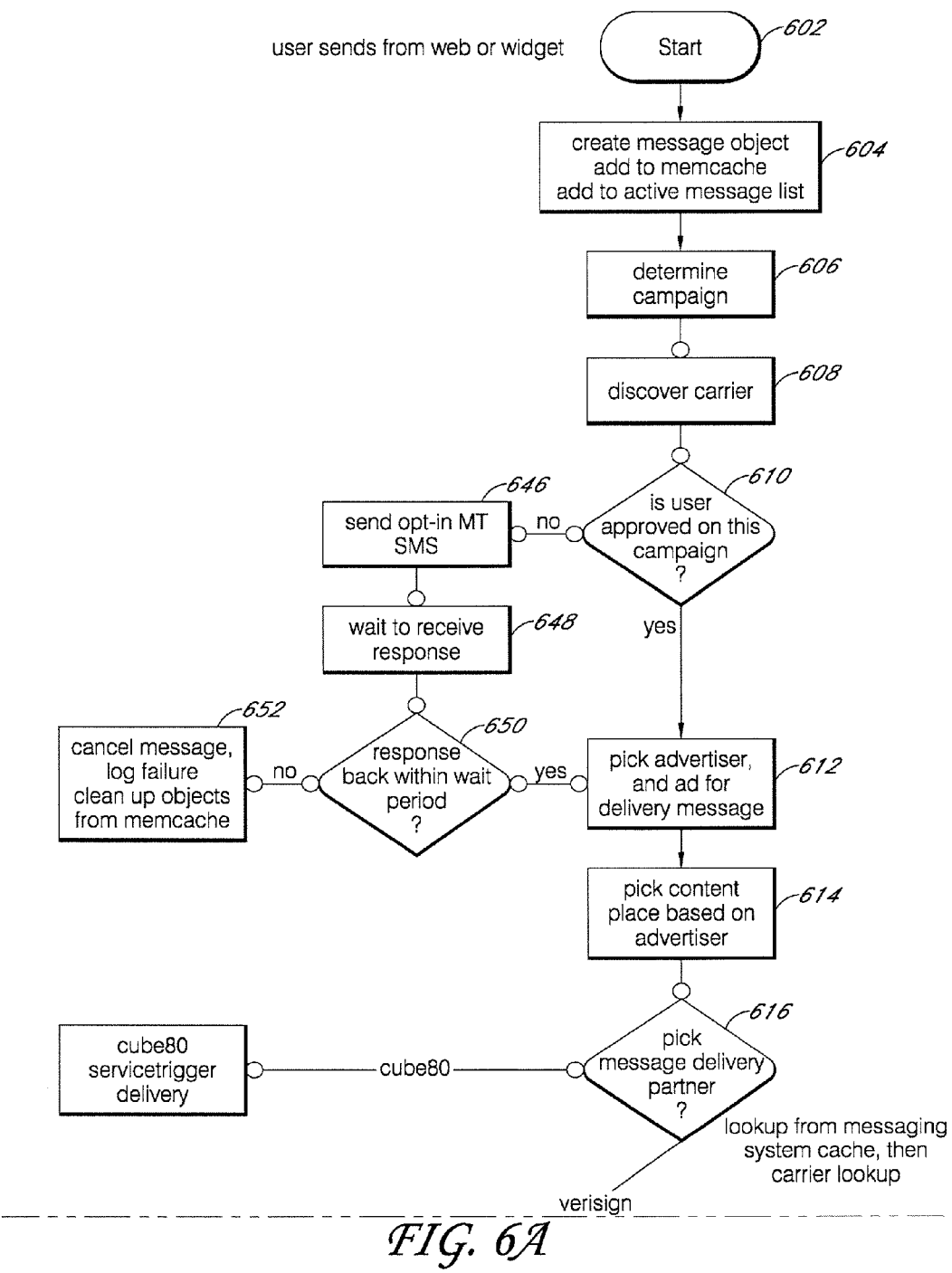
Figure 6B:
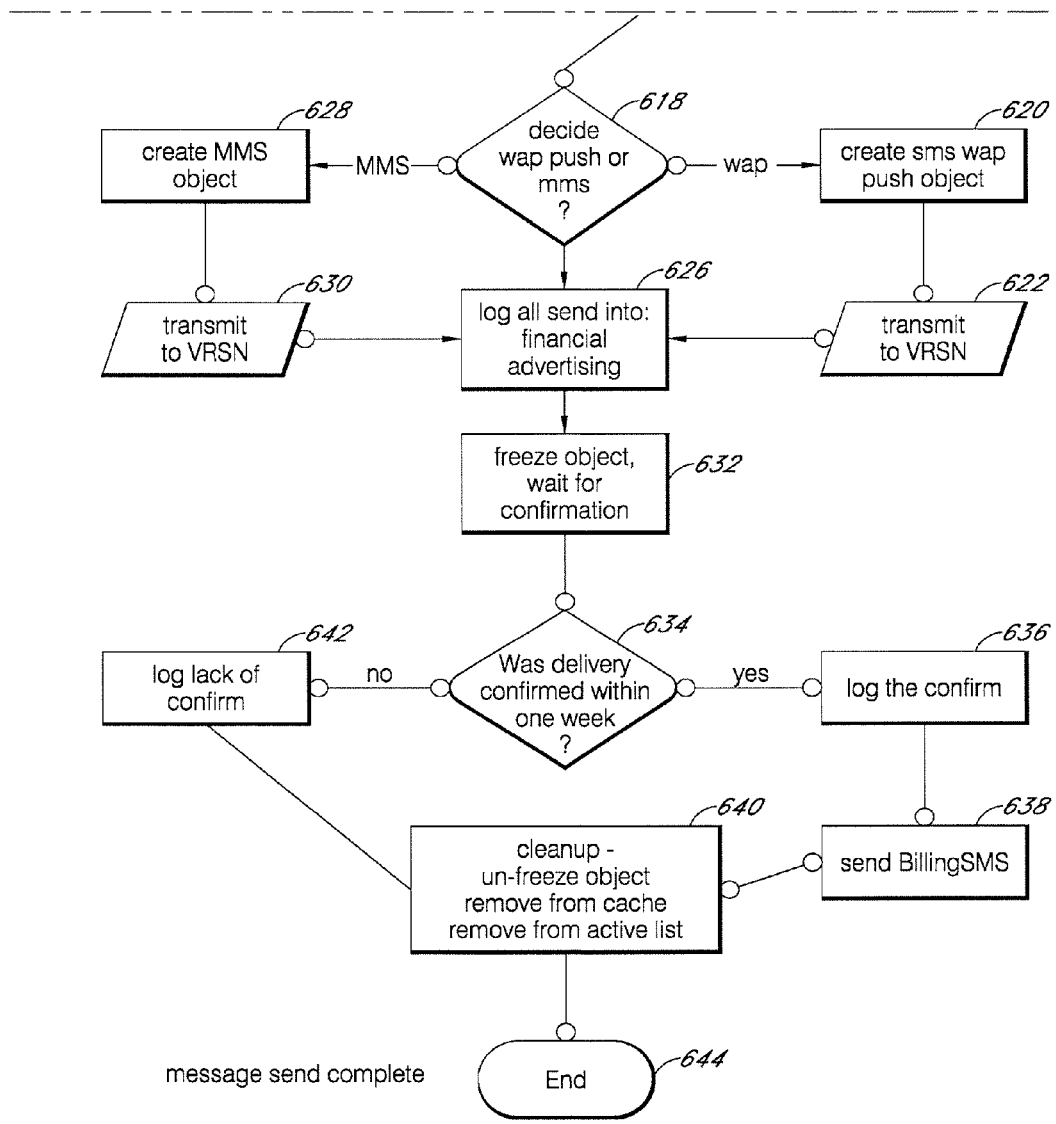
Figure 6:
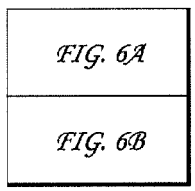

In addition, with reference to FIGS. 4 and 6, the example messaging system includes or has access to a user database storing user account information ("user") in the form of records, having fields for some or all of the following:

contact information (e.g., phone number ("phone#"), name, address, email address, etc);

a carrier identifier ("carrier") associated with the user's mobile device;

a handset identifier identifying the model or type of mobile phone the user is using ("handset") which can be used to determine the handset capabilities with respect to receiving an MMS or other message-types that can include a video (e.g., where the handset identifier is used to search a handset database to locate capabilities information associated with the handset);

a modification date (mod_date) indicating when the user last sent a message (e.g., last sent a video message) to another via the system (mod_date);

an inception date ("incep_date") indicating when the user account was created.

billing information (e.g., credit card number, debit card number, billing address, billing phone number, etc.);

user preferences (e.g., with respect to skins and message transmission techniques (e.g., MMS v. SMS push);

profile information (e.g., related to the user's demographics and/or likes and dislikes, optionally including a demographic vector profile);

historical information regarding content viewed, sent, received, and paid for by the user;

campaign information ("user_camp") including the following fields:

a user identifier ("user_id");

a campaign identifier ("campaign_id");

a pair of fields ("key" and "value", where the key and value together are a key→value hash, which are used together to store a value and a meaning for the value) that indicate if the user opted-in to the campaign identified by the campaign identifier (where the user will pay each time the user sends a video message unless the video is designated as being free to the user, such as when paid for by an advertiser) or is a subscriber (which allows the user to send a fixed number or unlimited number of video messages for a flat rate, or as part of the user's overall phone service plan), the amount, if any, the user will pay to send a video message associated with the campaign;

etc.

An advertiser database ("advertiser") is optionally provided that can include records for some or all of the following information:

an advertiser name ("name");

a code (e.g., a unique alphanumeric code generated by the messaging system) identifying the advertiser ("code");

advertiser contact information;

billing information (e.g., credit card, debit card, billing address, balance, etc.);

campaign information ("advert_camp"), including some or all of the following:

an advertiser identifier for the advertiser associated with the campaign ("advertiser id");

campaign identifier(s) ("campaign_id")

an indication (the "key" field) as to whether users need to opt-in to receive video/text advertisements associated with the campaign (where Key and Value store a status, such as OPTIN=TRUE where the key is the 'OPTIN' and the value is 'TRUE' the subscriber suggests that an indication is to be stored indicating whether the user had subscribed to that campaign. Key=>Value hashes can be utilized for storing information that the system operator does not know will need to be stored in the database, such as 'Car color'=>'silver', thus the key/value concept is a flexible way to store data);

advertiser content for the campaign(s);

the number of messages sent as part of a given advertiser campaign;

the number of active messages in the campaign (e.g., messages that are less than a specified period old (e.g., less than 1 week old, less than 1 month old, etc.) and/or messages for which a message received confirmation is still pending (e.g., when a message for which confirmation has been pending for more than a specified period of time, the message may be taken off the active message list because it is unlikely to be delivered, as may occur when a someone failed to opt-in)), the amount the advertiser is to be charged for the viewing and/or sending of an advertiser sponsored message for a given advertiser campaign;

identification of messages reserved by the advertiser, identification of video playlists defined and/or reserved by the advertiser etc.

carrier information for the campaign ("camp_carrier"), indicating which carriers are approved to send and/or receive for the campaign, including the following fields:

a carrier identifier ("carrier_id");

a campaign identifier ("campaign_id");

an indication ("key") as to whether the campaign is approved to send and/or receive via the identified carrier.

carriers that are to be used in sending messages for a given campaign.

A carrier database ("carrier") is optionally provided that can include records for some or all of the following information:

a unique identifier ("code");

the carrier name ("name").

The system includes a database (e.g., that may be in the form of a table) that stores active messages ("active messages") that have not yet had a message receipt confirmation. The active messages database can include record fields for some or all of the following information:

message identifier ("short code", e.g., a 5 or 6 digit phone number which can also be used to address SMS and MMS messages from mobile phones or landline phones);

destination address ("phoneto"), which may be, by way of example, a phone number;

origination addresses ("phonefrom"), which may be, by way of example, a phone number;

a message hash code ("objecthash").

The information stored in the active message database stores the state of a message in a message flow, which enables messages to be selectively "frozen" into a memory cache (also referred to herein as a "memcache"). The frozen message can then be accessed at a later time when an event occurs (e.g., when an opt-in event occurs that appears to be was from one of the numbers in the message flow). Optionally, the message hash is implemented as a Message-Digest algorithm 5 (MD5) hash (e.g., having a hash function with a 128 bit hash value, which may be expressed as a 32 character hexadecimal number). The hash may be used to uniquely and repeatably identify the combination of sender, receiver, and short code. An illustrative hash is provided below:

Transaction hash: 48fe5a7dd51744ddb8137495b286b74d

The memcache stores the transaction state of a message flow process for a message using the above hash as the key. In an example embodiment, the transaction state is an object (e.g., referred to as 'Transaction' object) and it is 'serialized' into the cache where it becomes frozen, until it is backed out of the cache to respond to an event, such as a handset discovery, an opt-in, a delivery receipt, etc. Thus, for example, during a message flow process, the object is "woken up" in response to an event, the next step in the process occurs, then the object is sent it to "sleep" in the cache again, over and over, until the process is completed (which may take seconds, a week, a month, or other time period), whether or not the message is successfully delivered.

A message log database ("message log") is optionally provided that can include records for some or all of the following information for a given logged message:

a message identifier ("message_id");

data/time sent and/or date/time received ("datestamp");

a message key (key=>value hash, for example the key might be 'deliverystatus' and value might be 'OK' or the key might be 'carrier' and the value might be 'Verizon', and so on);

message text ("value_text"—associated with the key above);

integer that can be described by the value ("value_int"), which is associated with a key (e.g., where the key is "age" and the integer value is "20") can be used by the system to ensure the text portion of the message does not exceed a specified allowable number of characters (e.g., by comparing the text message length with the maximum allowed and informing the user if the text message length has reached or exceed the maximum permitted length).

The system includes a database that stores advertisement activity information ("ad_activity") that can include record fields for some or all of the following information (e.g., related to transaction information such as advertisement views, financial transactions, etc.):

a message identifier ("messageid") corresponding to a sent message;

an advertiser identifier ("advertiserid") associated with an advertiser that is to be charged for sending the message;

an event identifier ("event") corresponding to an event (e.g., Valentine's Day) associated with the sending of the message;

a key/value pair (e.g., used for storing data regarding the advertiser);

how much the advertiser is to be charged for sending the message ("value").

The system includes a Web server that hosts a messaging Web site, including user interfaces, a data network interface (e.g., to the Internet), and a wireless network interface (e.g., including an interface to a messaging gateway).

A search engine is provided which locates videos and/or other content (stored on the messaging system or elsewhere) that can be included in a message based on a user query or a system query. The same or a different search engine is configured to locate videos or other content (e.g., stored on the messaging system or elsewhere) which an advertiser can use to locate identify messages and videos in which an advertisement can be included. The search engine(s) can search for specified categories, genres, associated tags, key words, etc. A registration engine is provided which can receive, process, and store registration requests and registration information. Fewer, more, or different system components can be used as well.

In an example embodiment, messages are shared from peer-to-peer. By way of example and not limitation, a user can create a personalized message containing text (e.g., types in or selected by the user), images, and/or video (e.g., selected and optionally customized by the user) and it is delivered to a recipient's mobile phone via a mobile multimedia message (MMS), which is capable of incorporating multimedia objects (e.g., images, audio, video, audio, rich text, etc.).

The service fee for sending such messages are, in an example embodiment, billed to a mobile phone bill (e.g., that of the message sender and/or receiver). Optionally, such messages can include one or more advertisements and in these circumstances, the service fee for the messaging cost is paid by the advertiser (e.g., wherein an advertisement is inserted before, after, during the message (e.g., as a tickertape), or as a product placement). Optionally, such advertisements are targeted (e.g., based on the known or inferred demographics of the recipient and/or senders, based on the date, the time of day, etc.).

FIG. 1 illustrates an example messaging environment. A messaging system 108 includes one or more of the databases 110 discussed herein (e.g., a content database, a user account database, an advertiser database, a carrier database, an active messages database, etc.). The messaging system may include a search engine (e.g., for searching for content, such as video greetings or other communications), a registration system configured to receive, process, and store registration requests and registration information. For example, the registration engine communicates with widgets and/or other messaging applications, and/or other systems. The messaging system 108 can communicate with distributed messaging applications hosted on user terminals (e.g., personal computers, Internet Protocol televisions, etc.). The messaging applications may, in certain embodiments, be used to download, view, and send video/text messages and video playlists. A distributed messaging application is optionally in the form of a widget that can be embedded by an end user in a web page (e.g., a blog web page, a social networking web page, etc.). The widget thereby provides efficient user access to content, playlists, and other data via a plurality of networked systems and optionally provides an efficient interface via which content, playlists, and other data can be obtained from a central repository and displayed on a web page the user is actually using, rather than requiring each website to store the content.

The messaging system 108 communicates with one more carriers, such as carriers 116, 118. The carriers 116, 118 may provide wired and/or wireless voice and data communication services. For example, the carriers 116, 118 may provide wireless voice and data communication services to mobile phones, such as cellular phones 102, 112, including voice communication, Internet services, and the ability to transmit and receive SMS, MMS, email, and/or instant messaging.

By way of example, the phone 102 can be associated with a sender of a video greeting and cell phone 112 can be associated with a receiver of a video greeting or other communication. The users associated with the cell phones 102, 112, may also be associated with user terminals, such as terminals 104, 114, which can be, by way of example, general purpose desktop/laptop computers, networked televisions, video game consoles, or other types of device that provides access to networked resources, such as a Web page. The terminals 102, 112, may include email applications, browsers, widgets and/or other messaging applications, such as those described herein, SMS/MMS applications, instant messaging applications, and/or other applications. The terminals may include volatile and non-volatile computer readable memory, displays, keyboards, mice; other user input devices, speakers, wired and/or wireless network interfaces, and/or other devices. The terminals 102, 112, may be used to access user accounts hosted by the messaging system 108, search for content, define playlists, send and receive video greetings and other messages.

An advertisement targeting system is optionally provided that can be used to define and assemble video greetings or other communications. For example, the system may be used to assemble user and/or advertiser selected and/or provided video, images, text, audio tracks, and to transmit an assembled message to one or more recipients at one or more addresses (e.g., SMS, MMS, email, or other address).

As will be described below, certain embodiments enable a user to create a video playlist from a library of videos, and embed a dedicated player/messaging application (which can be in the form of a widget) that accesses and plays the playlist on a plurality of web pages and websites. The messaging application, or a version thereof, is configured to be playable in a variety of environments (e.g., Internet Protocol-based environments, Internet websites, Internet Protocol televisions, Internet connected appliances, etc., although optionally the application is configured to be playable in other environments).

As will also be described below, certain embodiments of the system enable advertising, such as targeted advertising, to be inserted into text messages (e.g., Short Message Service (SMS) messages) or multimedia messages (e.g., Multimedia Messaging Service (MMS) messages). The messages may then be delivered to mobile phones (e.g., cellular phones) or a messaging application hosted on a terminal (e.g., a personal computer, Internet Protocol television, etc.). The message recipients may be selected and targeted based on their demographics, interests and/or their preferences.

Figure 2:
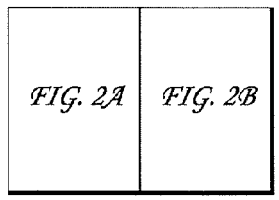
FIGS. 2A, 2B, 3, 4A, 4B, and 4C illustrate example user interfaces.
Figure 2A:
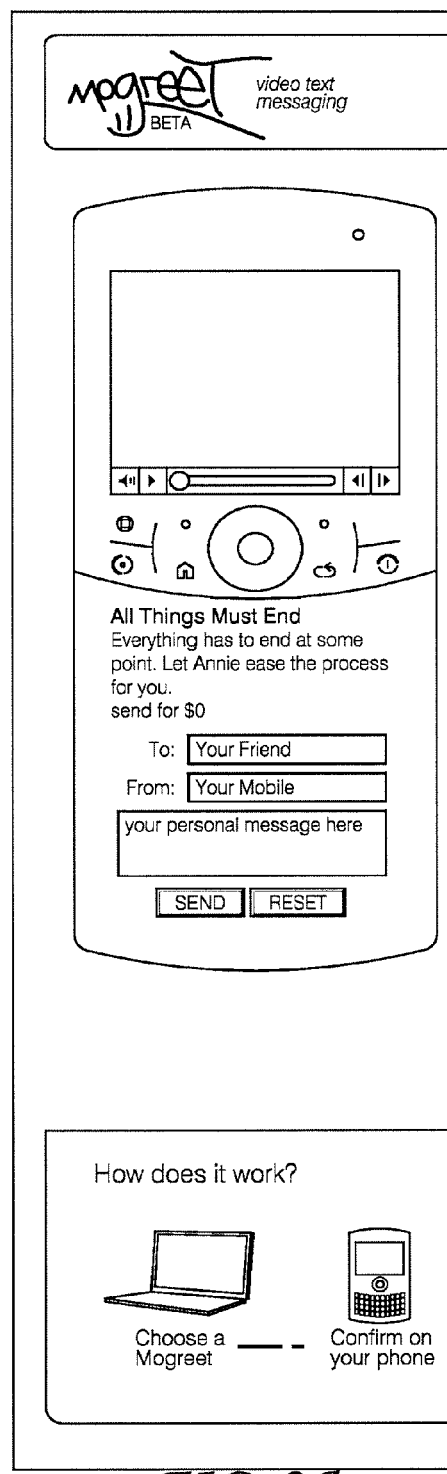
Figure 2B:
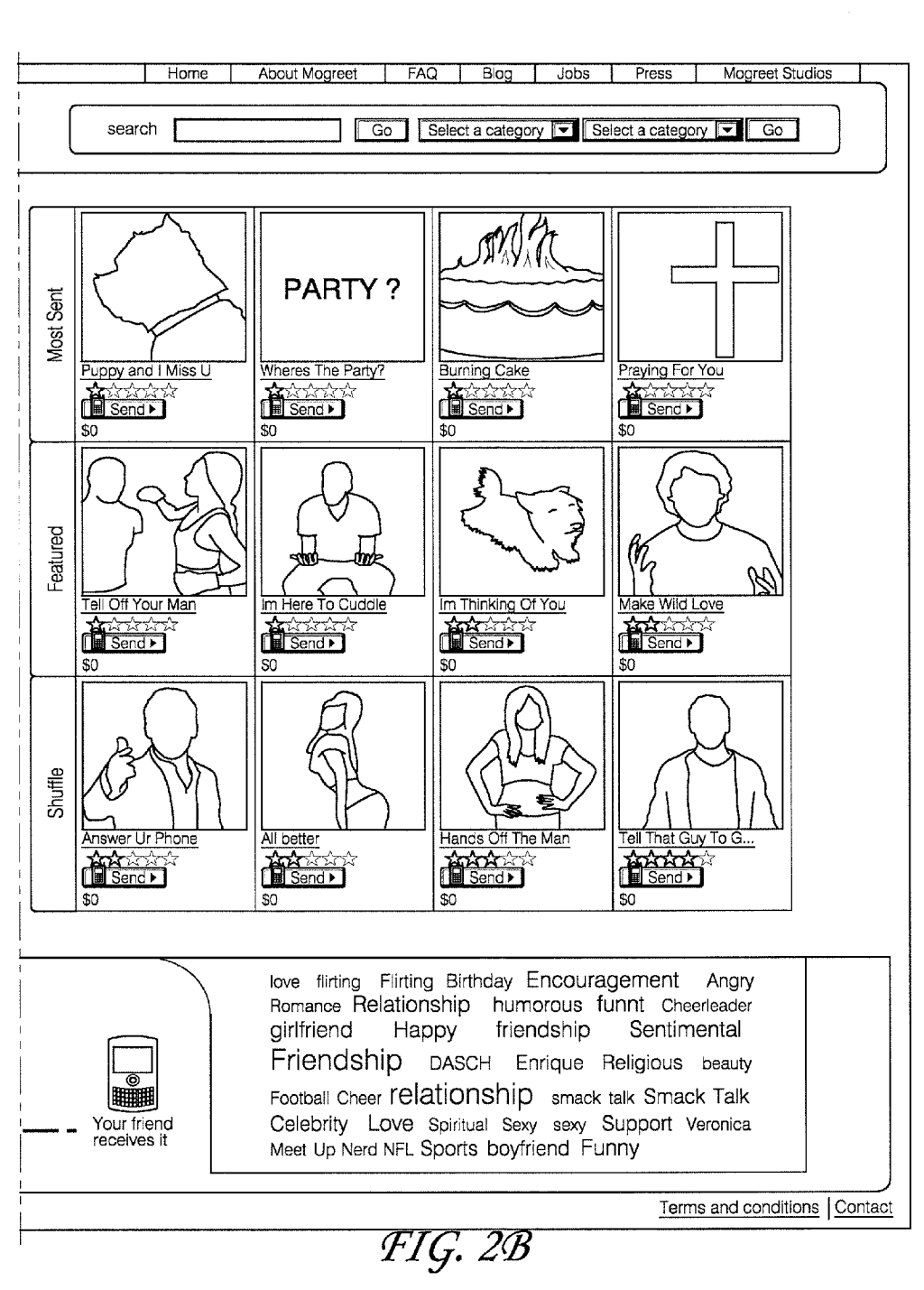
Figure 4A:
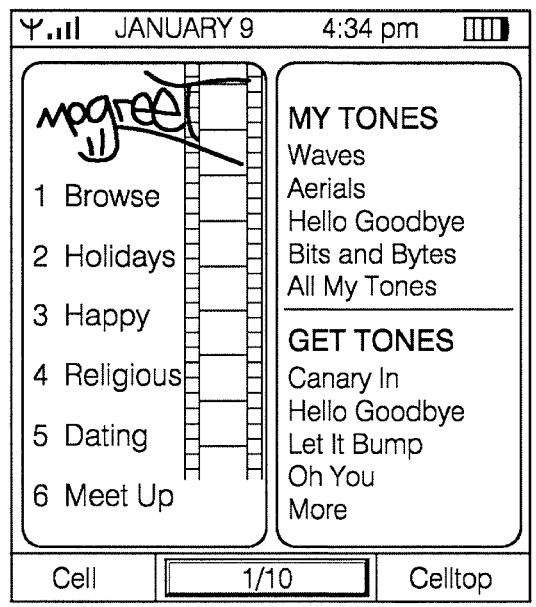
Figure 4B:
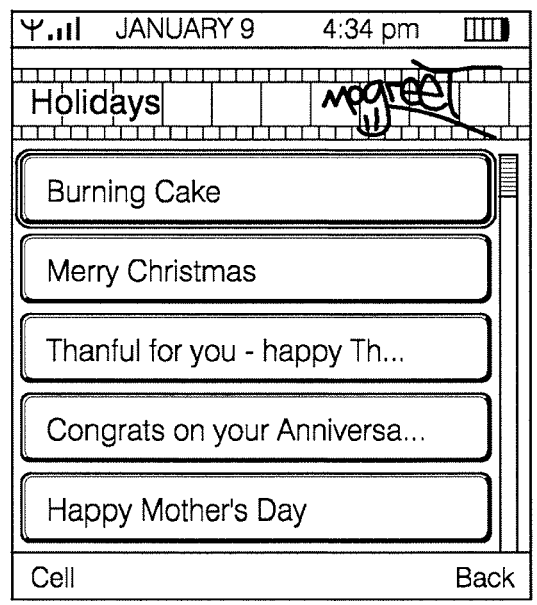
Figure 4C:
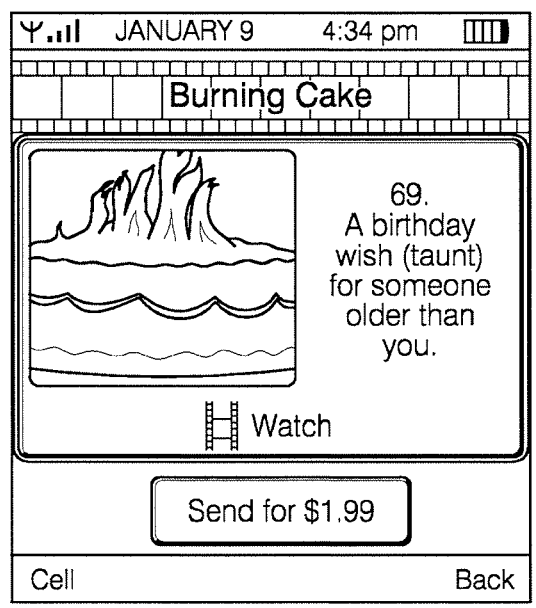

In an example process, a user accesses a first user interface hosted by a video messaging system. By way of example, the first user interface can be accessed using a Web widget, via a website using a browser, via a wireless application residing on a mobile phone (e.g., built in the Qualcomm BREW environment, an example of which is illustrated in FIGS. 4A-C, implemented via JAVA, or using other languages), or otherwise. The user interface, an example of which is illustrated in FIGS. 2A-B, presents one or more videos (e.g., via a video still, that when clicked on causes the video to be played), which may be organized into categories of videos, that can be sent as messages. By way of example, the categories can include one or more of the following:

Status related (e.g., running late, have to cancel, have to reschedule, will be there soon, etc.);
Birthday;
Anniversary;
Wedding;
Get well soon;
Condolences;
New baby;
Engagement;
Graduation;
Encouragement;
Friends;
dating;
holidays;
meet up;
religious;
meet up;
Invitation;
Surfing;
Running;
Basketball;
Football;
Hockey;
Soccer;
Baseball;
Tennis;
Archery;
Other Sports;
Video games;
Vacation;
New Year;
Jewish New Year;
Chinese New Year
Christmas;
Chanukah;
Kwanza;
Easter;
Thanksgiving;
Other Holidays;
Love;
Humor;
New job;
Moving;
browse;
etc.

The videos can also be organized or otherwise identified by genre (optionally including sub-genres), such as for example:

Manga;
General animation;
Musical;
Film noir;
Crime;
Mystery;
Science fiction;
War;
Sports;
Westerns;
Comedy (including sub-genres such as farce, satire, slap stick, etc.);
Drama;
Drama-comedy;
Romance;
Reality (including sub-genres such as live action, documentary, etc.);
Puppets;
Action;
Adventure;
Fantasy;
Horror;
Juvenile;
Video game;
etc.

The user then selects a video (e.g., directly from the first user interface or after first selecting a category (or performing a search) and then selects a video via a second user interface that displays one or more videos corresponding to the selected category (or that displays search results)).

Referring to the user interface is illustrated in FIGS. 2A-B (e.g., which can be a home page or user personalized home page hosted by the messaging system), in this example, the user interface, as a default, presents several, categories of videos that include videos that can be messaged. The example categories include:

"most sent" (e.g., those videos that have been most sent via the system overall or over a specified period of time, such as the last 24 hours, the last week, the last month or other time period as tracked by the system);

"featured" (e.g., being promoted by the system operator because the operator thinks they would be of interest to others, because a third party paid for the promotion of the videos, because they are new, or for other reasons);

"shuffle" (e.g., a random or semi-random selection of videos). Other categories can be used as well (e.g., most popular, newest, topical, free, etc.).

Videos can be recommended to the user based on the user's demographics, purchase history, peers or celebrity recommendations and/or using collaborative filtering.

In this example, the videos are associated with ratings assigned by users (e.g., a 1 to 5 star rating). In addition, a price is associated with a given video or category of videos. The price can be associated with the amount charged to the user for sending the video to a mobile cellular phone, by way of example. Optionally, the user can have a subscription, wherein the user is entitled to send a certain number (or an unlimited number) of video messages per month (or other specified period of time) for a fixed monthly fee or as part of an overall calling plan fee.

A tag area is provided which lists tags (e.g., relevant keywords or terms) that have been associated with one or more videos, wherein clicking on a tag causes the system to present videos associated with the tags via the user interface. The tags may have been assigned by one or more users and/or the system operator.

Search fields are provided by the user interface via which the user can submit a search query (e.g., using words, phrases, menu selections, etc.). A search engine locates videos corresponding to the search query terms and displays corresponding search results, optionally with the more relevant results displayed first/higher up. In this example, a search text entry field is provided via which the user can enter search words or phrases. A category menu is provided via which the user can select one or more categories (such as those discussed above) to which the search is to be limited (e.g., birthday, congratulations, status, etc.). Optionally, a genre menu is provided via which the user can select one or more genres (such as those discussed above) to which the search is to be limited. Other search menus and fields can be utilized.

In this example, a media player area, configured to appear as a mobile phone or other device, is provided via which a video can be played and via which a video text message transmission can be initiated. The media player optionally includes play, pause, rewind, and fast forward controls, as well as volume controls. The name of the video being viewed and the cost for sending the video is displayed. In addition, a "To" field is provided via which the user can enter an address of a recipient (e.g., by typing in the address or by selecting the address via a contacts database). A "From" field is provided via which the user can insert the address that is to be displayed to the recipient and is optionally associated with the device from which the video will be sent (e.g., the user's mobile phone). A text message field is provided via which the user can enter a text message to be associated with the selected video when sent as a message. A "Send" control is provided via which the user can instruct the system to initiate the transmission of the video text message to the designated recipient.

Figure 3:
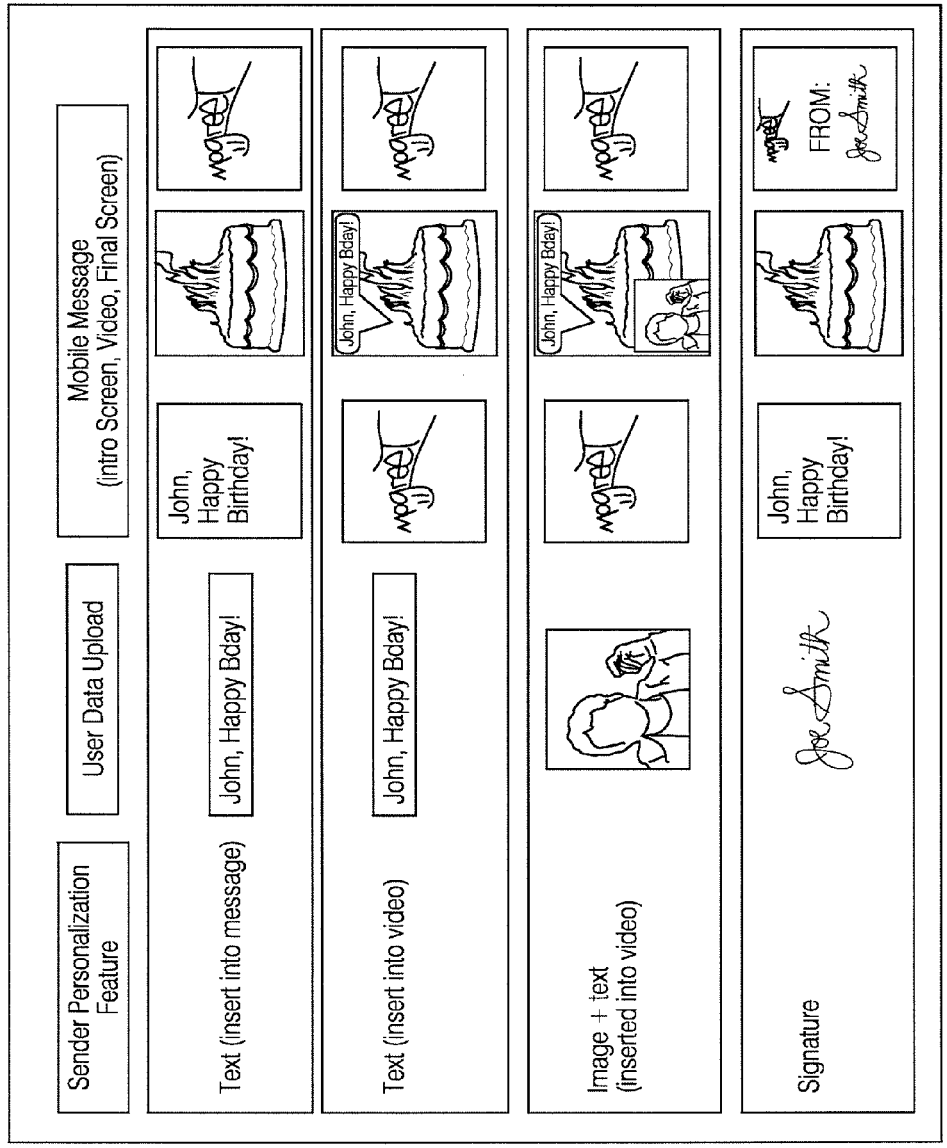

FIG. 3 illustrates another example user interface that can be utilized to personalize/edit a video-text message. Several different personalization options are provided, including the following:

Insert introductory text into the message (using a text field) so that it is displayed in an introduction screen prior to the video;

Insert text into the message so that it is displayed in the video itself (e.g., in a tickertape at the bottom and/or top of video frames, in a text balloon, with or without text animation (e.g., wipe, zoom, arc, fade in, fade out, dissolve, appear, appear and dim, spin, unfold, ascend, descend, grow and exit, etc.));

Insert image and text into the message so that it is displayed in the video itself (e.g., where the image is uploaded by the user or is selected from a library of images hosted by the system or elsewhere), wherein, for example the image is that of the user (or other person) and the text is optionally display in text bubble so that it appears that the user is speaking the text, as in a comic book;

Insert text into the message so that it is displayed in an introduction screen prior to the video and insert a signature (optionally including a text message, an image of a handwritten signature, and/or other uploaded images) so that it is displayed in a screen after the video;

Choose from a pre-set list of text messages (e.g., derived from the more/most recent messages sent or pre-scripted so that it is displayed in an introduction screen prior to the video)

Insert a video into the message (e.g., a personal video uploaded by the user) so that it is displayed as an introduction video prior to the video selected from those hosted by the system (e.g., selected using the interface illustrated in FIGS. 2A-B);

Insert a video into the message (e.g., a personal video uploaded by the user) so that it is displayed as a video after the video selected from those hosted by the system (e.g., selected using the interface illustrated in FIGS. 2A-B).

A text field is provided wherein the user can enter a text message as discussed above. A Data Upload control is provided via which the user can select a data file and/or image file (e.g., stored on a user device, such as a personal computer, a removable memory module, or other device) to upload to the system (e.g., where it is stored on a system server) for use in a video message as discussed above.

After the user has composed the video message (e.g., via an option described above) the user enters in the destination phone address (e.g., the recipient's mobile phone number). The video messaging system assembles the message data (e.g., the text, images, videos selected or provided as discussed above) into a multimedia message (MMS) for delivery to the recipient's mobile phone. The messaging system checks the recipient's mobile phone number against a wireless carrier database (e.g., hosted by a third party of the messaging system), formats the data for the correct message delivery format (e.g., as specified by the recipient's wireless carrier's specifications) and the system pushes the message to the recipient's mobile phone. For example, a WAP (Wireless Application Protocol) push can be used by specifying the URL (via SMS) of the pre-compiled video message (e.g., using an MPEG related format, such as 3GP, a multimedia container format defined by the Third Generation Partnership Project) hosted on the messaging systems web server.

Optionally, immediate delivery can be used. For example, when an MMS client on the recipient's mobile phone receives the MMS notification, the client substantially immediately and automatically retrieves the MMS message from the Multimedia Messaging Service Center (MMSC) that sent the notification. After retrieval, the subscriber is alerted to the presence of a newly arrived MMS message. Optionally, rather than using immediate delivery, deferred delivery can be used where the recipient's MMS client provides an alert indicating that an MMS message is available, and enables the user to retrieve the MMS message at a time of the user's choosing by activating a retrieve message control.

FIGS. 4A-C illustrate example user interfaces provided via a wireless application residing on a mobile phone. However, the user interfaces can optionally be customized by a user and/or the system operator. Thus, other embodiments may have fewer, additional, or different menus and/or less, additional or different information. The first user interface is a personalized user home page. Several categories of video clips are provided, which may have been previously selected by the user, were the last used by the user, and/or are include the most popular categories. Optionally, a "Browse" section lists video text messages previously selected and/or sent by the user. Optionally, the "Browse" section lists video clips the user may be interested in (e.g., as determined using collaborative filtering or based on popularity among user in general). If the user selects the "Holiday" category, the second user interface is presented. The second user interface lists individual videos, including a descriptive title. If the user selects an individual video, a user interface, such as the third user interface, is presented. The third user interface displays a frame from the selected video, provides a more detailed description of the video, lists the price for sending the video, and enables he user to play a sample (or all) of the video.

The cost(s) associated with a video message can be processed a variety of ways. For example, the cost for using and/or sending a video message (optionally including text and images) can be paid by an advertiser. By way of illustration if a customer selects an advertiser-sponsored "free" message (e.g., as designated via the user interface illustrated in FIGS. 2A-B, where the user is not charged for use the user of the video message, although optionally airtime charges may still apply), the message sent to the recipient's mobile phone will contain an advertisement with the message being paid for by an advertiser. By way of example, the advertisement may be in the form of a video provided by the advertiser, a banner advertisement or logo of the advertiser, an advertiser-placed product within the message, an advertiser audio track (e.g., a jingle), etc. A free message or reduced cost may also be provided by the user entering in a code (e.g., a promotion code sponsored by and/or provided by the messaging service operator or other entity promoting a good a service) into a corresponding field presented in a form. by the messaging system.

If a customer selects a "premium" message (where the user pays for the video message), the message sent to the recipient is billed to the sender via their mobile service provider's phone bill or counts against their subscription if the user has a message subscription service. In this example, the user/sender enters their mobile phone number and the recipient's mobile phone number in corresponding fields prior to sending the mobile message. The messaging system prompts the sender to authenticate/approve the cost of sending the message prior to delivering the message to the recipient. For example, the system may transmit an authentication request text message that requests the sender to confirm that the sender wants to send the message and is will to pay for such message. For example, the message may be an SMS message with the following text (although other text can be used as well):

"reply 'Y' to approve sending this content"; or

Figure 5:
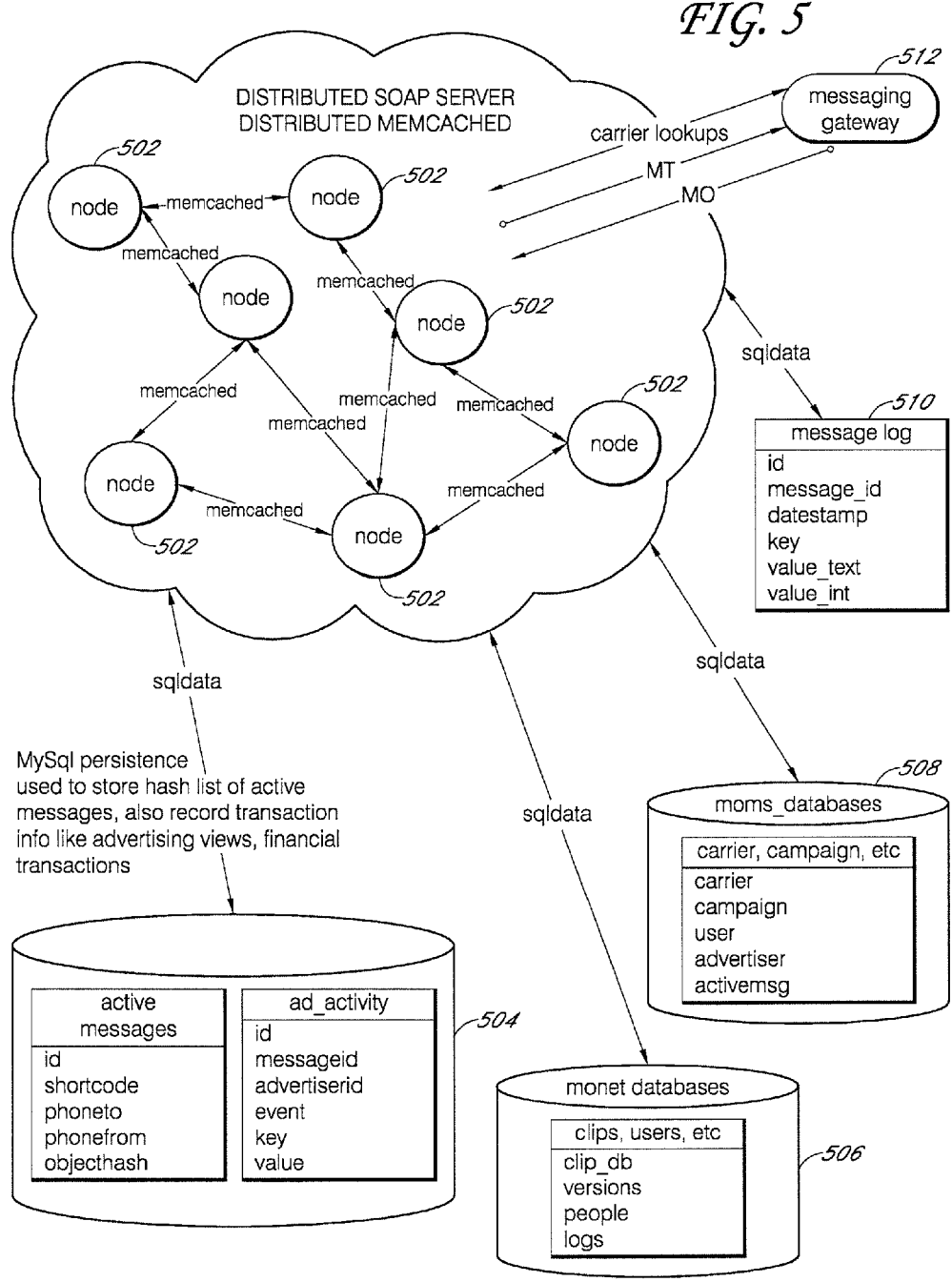
FIGS. 5, 6A, 6B, and 7 illustrate example systems and processes.
Figure 7:
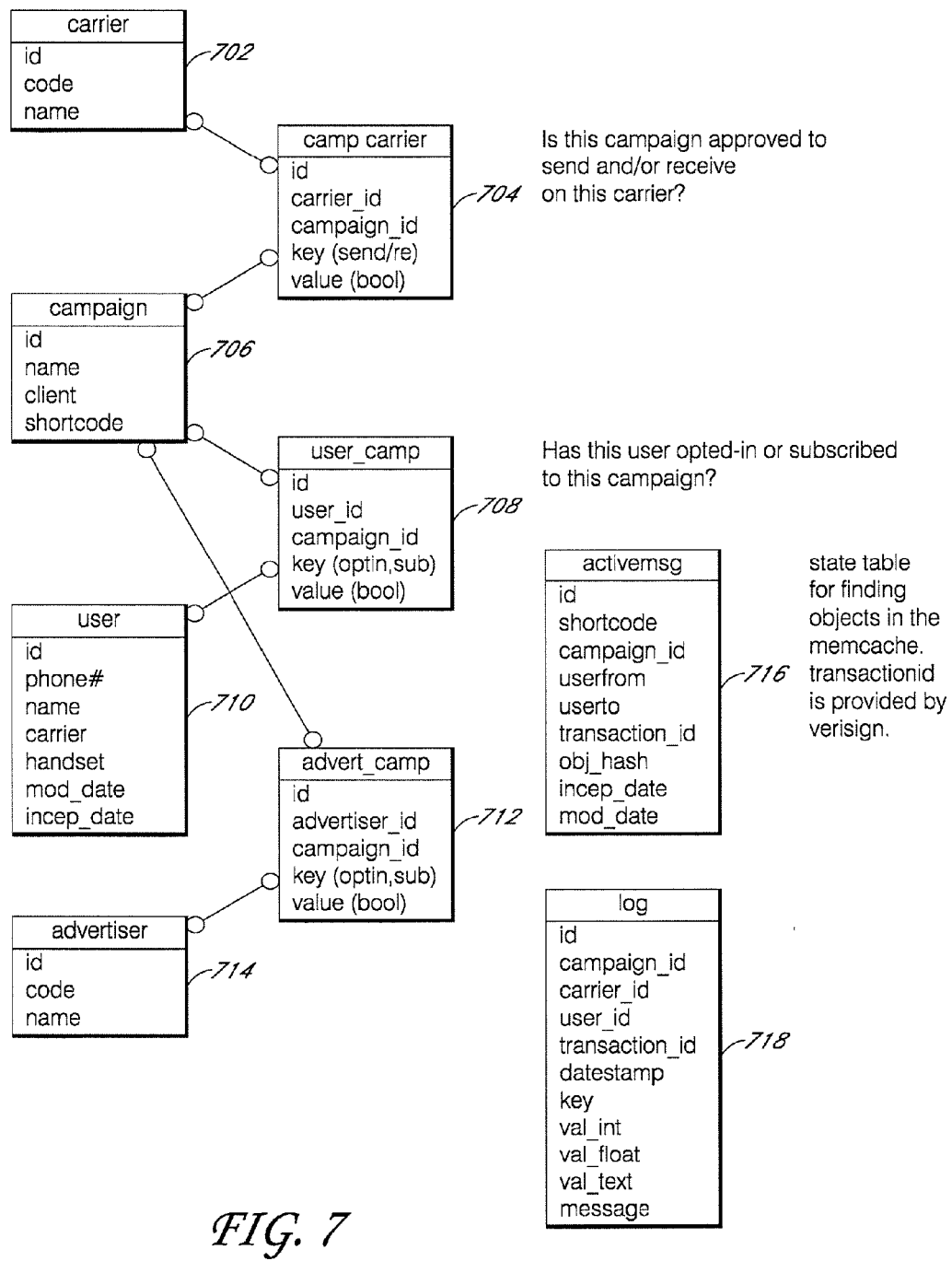

"Reply 'Y' or 'Yes' to send the greeting for $.XX to [Recipient x]";

Upon receiving an affirmative reply to authenticate the cost of the transaction (e.g., a "Y" or "Yes" via an SMS message), the message is assembled and delivered to the recipient (although optionally, the message can be assembled prior to receiving the authentication). An example message flow is illustrated in FIGS. 5-7, discussed further below. Once the authentication has occurred (e.g., and after the recipient received—the message), the messaging system alerts a billing service provider (which has relationships with the various telecommunications service partners) to insert the message billing charge on the individual sender's mobile phone bill.

As previously discussed, an advertisement may be included with or inserted into a video message. Optionally, the advertisement inserted into the mobile message sent is selected using advertiser criteria, some or all of the following data (also referred to as the "sender message value"), and/or optionally using collaborative filtering (e.g., making predictions regarding the user's interests by collecting interest information from other users that have one or similarities with the user to whom the advertisement is being provided):

the demographic profile of the sender (e.g., age, income, gender, profession, location, etc.);

the demographic profile of the receiver;

descriptive tags associated with the video clips (e.g., entered by end users or the messaging system operator);

text inserted by the sender into the recipient message;

images inserted by the sender into the recipient message;

the date the message is being sent;

the time the message is being sent;

the weather;

surf conditions;

ski conditions.

As similarly discussed above, the messaging system optionally includes an advertiser database, including tables that pertain to the advertising campaigns registered in the system. A campaign can be based on a number of variables, including, by way of example, specific occasions (e.g., seasonal holidays) and/or genres (e.g., manga, film noir, crime, mystery, science fiction, war, sports, westerns, comedy (including sub-genres such as farce, satire, slap stick, etc.), drama, drama-comedy, romance, reality, puppets, action, adventure, fantasy, horror, juvenile, video game, etc.), or themes of content (e.g., football, baseball, basket ball, hockey, sports in general, fashion, travel, finance, food, restaurants, music, books, magazine, pets, etc.).

Advertisers interested in participating in the advertisement using video messaging service optionally establish an "advertiser campaign value," (e.g., a calculation that compiles the demographic vector profile of an advertiser's preferred or desired consumer group (e.g., teen males residing in California, women between the ages of 22-29 living in Manhattan, etc.) and the genres or messages that they would like to be associated with.

In order to ensure that an advertiser's advertisement are associated with the appropriate videos, certain data is collected via one or more user interfaces from the advertiser including some or all of the following:

the advertiser's intended consumer audience;

the genre/message type the advertiser would like to associated with;

digital advertisement and/or copy to be included in the advertisement (e.g., via a digital upload to the system);

the maximum bid amount that they are willing to pay for the most highly correlated match to their intended consumer audience.

For a given user of the messaging service, the system generates a vector to describe the demographic profile of the user based on the history of what messages the user has visited, seen, sent and/or received via the messaging system (e.g., online, mobile, etc.).

This vector is stored in the messaging system's user database, where it is included in the user's profile and is updated by the user's interaction with the messaging service, optionally in substantially real time.

When a sender chooses to send a "free" message in which an advertisement is to be included, the company's software compiles the sender message value and searches for a correlated advertiser campaign value. The strength of the correlation needed may be specified by the system operator and/or the advertiser. When there is a sufficiently strong match and the maximum bid (assuming an auction is being held to include advertisements in such messages) does not exceed the value of the message (e.g., pre-set by the company), the advertisement is inserted into the free message sent to the recipient. If the bid amount is not met, optionally the messaging system searches for the strongest correlation(s) that meets the bid requirements for the free message. If no match is found, optionally, no advertisement is inserted into the message. Instead, optionally an advertisement from a third party is inserted into the message, or an advertisement for the services of the messaging system is inserted into the message.

When the message has been successfully delivered to the recipient's mobile phone (e.g., as detected from signaling information or billing confirming delivery), the system updates the advertiser account within the system database to record the event and initiates the process for billing the advertiser for the advertisement insertion.

FIG. 5 will now be described in greater detail.

A plurality of server nodes 502 are optionally geographically distributed so as to be relatively close to areas where there are substantial numbers of users. For example, the server nodes 502 may include a group of Web serving nodes that host a messaging Web site, including user interfaces, a data network interface (e.g., to the Internet), and a wireless network interface. The server nodes may be used to store and push Web pages, widget code, etc., and to cache messages. The nodes have access (e.g., via an interface) to one or messaging gateways 512 and can perform or request carrier lookups to determine which carrier is associated with a given recipient address and/or send address. In addition, the nodes can query messaging system databases and store data in messaging databases. In the illustrated example, the nodes 512 can query database 504, which includes an active message database and an advertisement activity database, as described elsewhere herein. In addition, the nodes 512 can query database 506, (e.g., including a content/clips database, users, etc.). In addition, in the illustrated example, the nodes can query database 508 (carrier database, campaign database, user database, advertiser database, etc.). Further, the nodes 502 can query the message log 510, described elsewhere herein. Other embodiments can interface with fewer, additional, or different databases.

FIG. 6 illustrates an example messaging process. At state 602, the process starts, where a user composes and requests the sending of a video message (optionally including text and/or an image) to a recipient. By way of example, the user may have composed and submitted the message transmission instruction via a user interface presented via a Web page or via a messaging application as discussed above with respect to FIGS. 2 and 3. At state 604, the messaging system creates a message object and adds it to a distributed messaging cache (e.g., to store the message in transit, such as during periods where the system is waiting for the user to act) and to the active message list (e.g., to the distributed server nodes illustrated in FIG. 5).

At state 606, a determination is made as to what campaign the message is entitled to. For example, the user may have a subscription, where the user pays a flat rate (or the cost is included in a calling plan service subscription) for a certain number of messages for a given time period or an unlimited number of messages. If the user has a subscription and has not reached the subscription message limit, the user will not be charged an additional fee for the message. If the message is part of an advertising campaign, wherein an advertiser pays for the message, then the user will not be charged a fee for the message. Otherwise, if the message is not a free message, the user will be billed for the message via the sender's carrier. At state 608, a determination is made as to which wireless carrier the sender and/or recipient is associated with (e.g., via a carrier lookup from a carrier database).

At state 610, a determination is made as to whether the user is approved for the campaign. If the user is not on a message subscription plan and the video is not eligible for a free transmission, the process proceeds from state 610 to state 646, and the system sends an opt-in message (e.g., a message, such as an SMS message, sent to the user's mobile phone). The opt-in message requests the user to confirm that the user wants to send a message for a specified fee (e.g., which will be charged to the user's phone bill). The message may ask the user to transmit a reply confirmation message so as to authenticate the message transmission request and to authorize the associate message charge.

At state 648, the system waits up to a predetermined amount of time (e.g., 1 day, 2 days, a week, 10 days, or other amount of time) for a confirmation message to be received (e.g., via an SMS message). At state 650, the system determines whether the response was received back within the predetermined amount of time. If a response was received within the specified amount of time, the process proceeds to state 612. If a response is not received within the specified amount of time, the process proceeds to state 652, the message is marked as canceled, a log failure for the message is recorded, and the message is removed from the message caches.

If the user is approved for the campaign, the user's opt-in is stored for later reuse. For example, once a user has opted in for a specific campaign, that information is retained in the system database. Then the next time the user sends a video clip via the system, the system first determines whether the opt-in has already occurred, and is still current (e.g., where the opt-in is set to automatically expire after a specified period, such as 6 months). If the opt-in is current for that user on that campaign, the authentication process is skipped, making the customer experience better and faster, and the process proceeds to from state 610 to state 612. Then, at states 612, 614 the system selects an appropriate advertiser (e.g., based on the recipient's demographics, profile vector, and/or other criteria discussed above) and advertisement/content to include in the message. At state 616, the system selects a messaging gateway provider/message delivery partner (e.g., based on the carrier lookup and/or a predetermined, cached carrier list.). A post or "get request" is optionally used to send the message to the delivery partner.

At state 618, a determination is made as to how the message is to be delivered to the recipient (e.g., via a WAP push or via an MMS message). For example, the determination may be based on the recipient's carrier or mobile phone-type of the recipient (e.g., wherein if the mobile phone is capable of receiving an MMS message and the carrier is capable of sending an MMS message, the video is sent via an MMS message, otherwise the message is sent via an SMS WAP push message). A SMS WAP push message may include a specially formatted SMS message that displays an alert message to the user, and give the user the option of connecting to a particular URL via the mobile phone's WAP browser to thereby access and view the video message.

If a WAP push is to be used, the process proceeds to state 620 and an SMS WAP push object is created. At state 622, the WAP object is transmitted the gateway provider for forwarding to the carrier being used to transmit the message to the recipient mobile phone. At state 626, the gateway provider forwards billing information (e.g., including billing information from the carrier) to the messaging system (e.g., including a message receipt confirmation), which the system logs. The system further logs corresponding advertiser billing information, message delivery costs, video clip pricing, royalty calculation information, messaging statistic records, and/or other data.

If, at state 618, a determination is made that an MMS message is to be used, the process proceeds to state 628, where an MMS object is created. At state 630, the MMS message is transmitted to the service provider for forwarding to the carrier being used to transmit the message to the recipient mobile phone.

At state 632, the message object is "frozen" (e.g., kept on the active message list and retained in message cache) until receipt confirmation is received from the carrier (e.g., via the service provider). At state 634, a determination is made as to whether a delivery confirmation was received within a specified amount of time (e.g., one week or other amount of time). If confirmation is received, the process proceeds to state 636, and the system logs the confirmation in a system database. At state 638, a billing SMS occurrence takes place. At state 640, the message object is unfrozen, removed from the message cache, and removed from the active message list.

If at state 634, delivery confirmation was not timely received, at state 642 the system logs the failure to receive a receipt confirmation, and the process proceeds to state 642, as similarly discussed above. At state 644, the message send process is ended.

FIG. 7 illustrates which databases (optionally including tables) are queried and/or updated during the example process illustrated in FIG. 6. In this example, carrier table 702, campaign carrier table 704, campaign. table 706, user campaign table 708, user table 710, advertisement campaign table 712, advertiser table 714, active message table 716, and log table 718 may be queried and/or updated during an example transmission of a video or other message to a recipient. For example, campaign carrier table 604 may be queried to determine whether a given campaign is approved to send or receive messages (e.g., video messages including advertisements) or a given carrier. By way of further example, the user campaign table 708 may be queried to determine whether a given user has opted-in or subscribed to a given campaign. By way of still further example, the active message table 716 may be updated with the current message state and queried to locate objects in the memcache. By way of further illustration, the transaction ID field may be populated with a transaction identifier provided by a third party, such as Verisign 0.

The use of messaging applications, such as widgets, will now be described in greater detail.

Figure 8A:
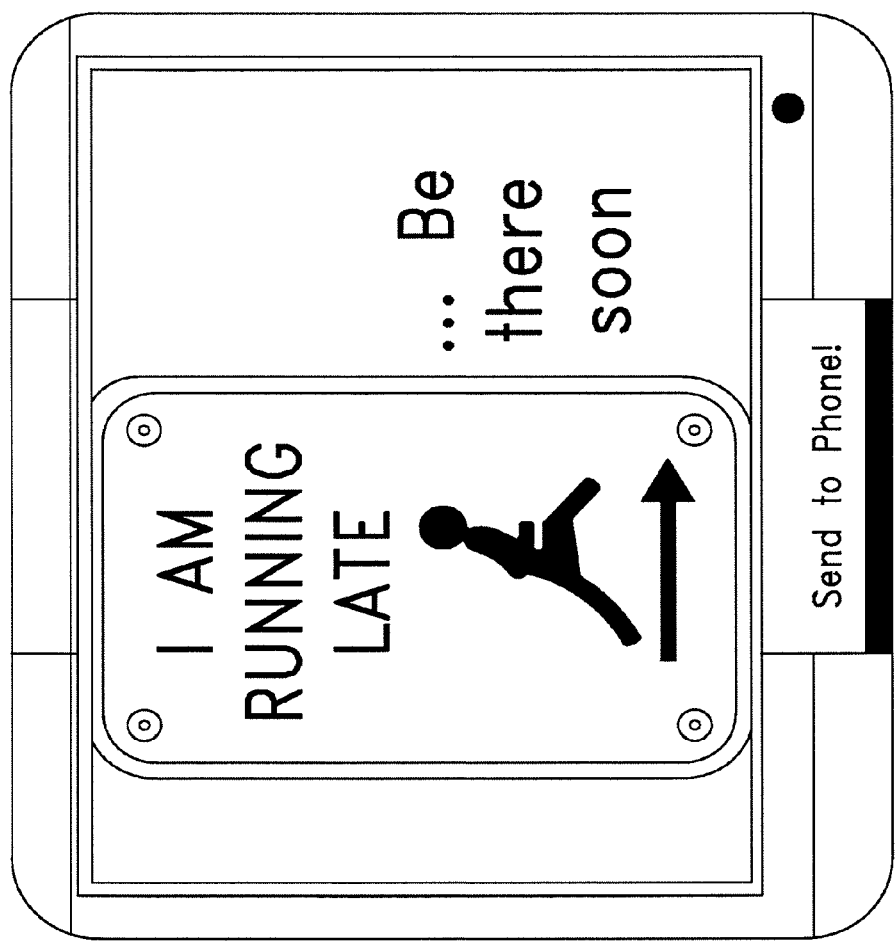
Figure 8B:
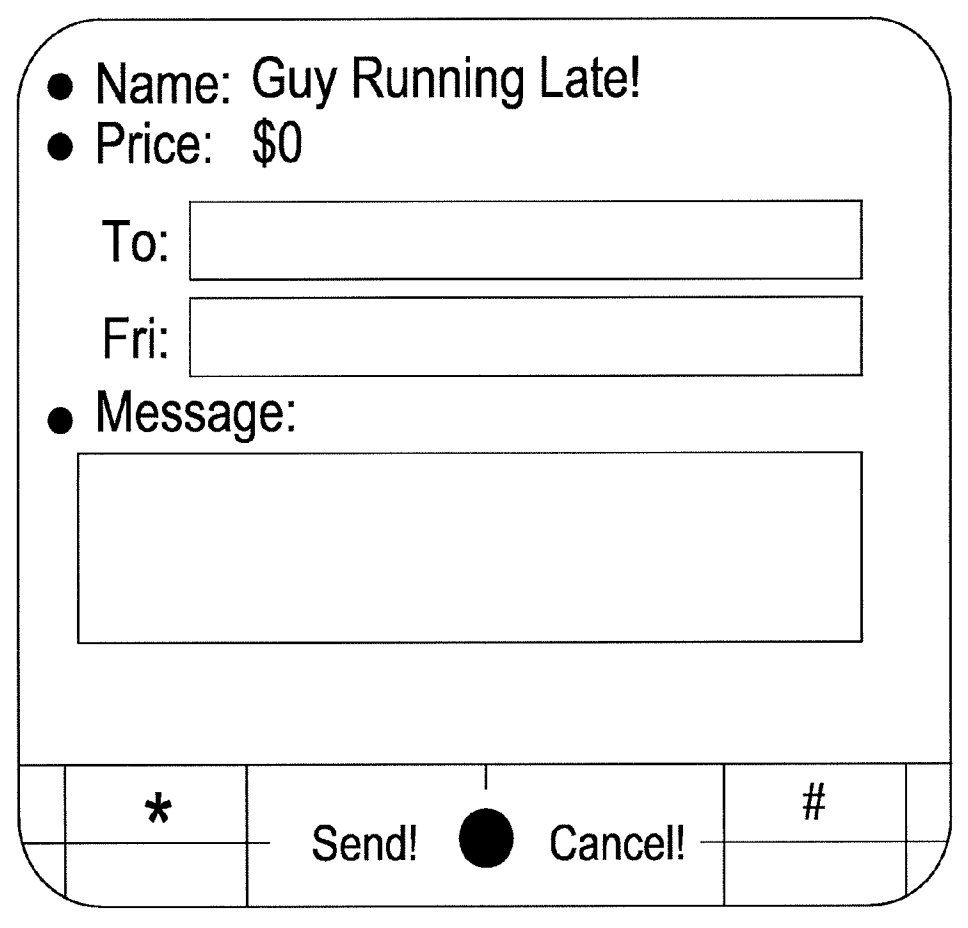

In an example embodiment, a client messaging application is provided that can reside on a plurality of Internet websites and Web pages. Optionally, the messaging application is a widget that is in the form of code that can be installed and executed within a HTML-based web page by an end user (e.g., without requiring manual compilation). An example messaging application implemented as a widget is illustrated in FIGS. 8A-B, which are discussed in greater detail below. Despite its optional small file size and the relatively small amount of screen real estate used, the messaging application widget enables significant functionality, including some or all of the following:

the ability to be embedded on multiple websites and web pages;

manage registration via the messaging system's online registration process;

customize and download video playlists (e.g., list of content, such as videos, that can be messaged);

send and receive Internet and mobile messages;

bill consumers and advertisers;

generate income based on usage of the messaging application.

collect, aggregate and store information (e.g., body of message, phone numbers) to build demographic profiles of customers, etc.

An example embodiment of an end user installation process will now be described. Prior to the installation of the messaging application, the user may have defined one or more playlists by accessing a playlist generation web page hosted by a messaging system, such as that described above. The playlist may include one or more video clips selected from a library of video clips. All or a portion of the library may also be hosted by the messaging system. Thus, for example, the user may create and name a playlist file and select one or more videos from the library and add them to the playlist file. Optionally instead or in addition, the system operator or an advertiser may have defined one or more playlists.

The user can optionally customize the video clips by including introductory text and/or images, and/or post-clip text and/or images. In addition, the user can optionally insert text and/or images into the video clip. Such customization is described in greater detail elsewhere herein.

Then, at state 1, the system generates HTML code for the messaging application, optionally including a playlist identifier/link. The user views or receives the HTML 'embed' code for the messaging application.

By way of illustration, the embeddable URL can be emailed to the user, provided in a Web page link, via a text message, via a wireless website, via a wireless application, via a widget, or other interface. The HTML code for the messaging application is optionally customized to include an identifier (e.g., a unique identifier) associated with the user so that the message can identify which messaging application is associated with which user.

At state 2, the user enters the HTML code of the widget into the code of a webpage (e.g., one or more of the user's blog, social network pages, personal website page, etc.). Optionally, the user can enter the code into an HTML editor, such as Microsoft FrontPage, Adobe GoLive, etc., and can edit the HTML code prior to embedding it into a Web page.

At state 3, the code is saved and compiled, and when the web page (embedded with the widget code) is being viewed via a web browser (e.g., by the user or someone visiting the web page having the widget code embedded therein), the messaging application/widget will be live and enable web viewers to utilize some or all of its functions.

For example, at state 4, when the widget appears on a web page, the widget queries the messaging system (e.g., by accessing over the Internet a corresponding URL preprogrammed into the widget) for a playlist of videos (e.g., previously defined/assembled by the user, another user, or the system operator).

At state 5, the messaging system accesses the playlist (e.g., where the URL preprogrammed into the widget is uniquely associated with the playlist or the widget passes a code associated with the user to the messaging system and the system uses the code to locate the corresponding user playlist) from the data store (e.g., an HTML cache table). The system returns the corresponding playlist to the widget (e.g., the names of the videos, the cost of forwarding the videos as a message to others, etc.). In an example embodiment, the playlist is transmitted as XML data, or optionally as a JSON (JavaScript Object Notation) object.

At state 6, the widget reads the playlist to access some or all of the following: the name, price, and location (e.g., URL) of the content(s) and/or the graphic user interface ("skin") of the widget. Some or all of the foregoing information is stored in association with a given piece of content within the messaging system's content database (and accessed from the messaging system's database).

At state 7, the widget retrieves the content (e.g., via http (hypertext transfer protocol) or the Real Time Messaging Protocol). The widget displays the content, or a portion thereof (e.g., one or more of the retrieved videos) within the widget content display area. The widget may include playback controls enabling a viewer to control the playback of the content (e.g., rewind, fast forward, play, pause, etc.). Optionally, prior to a viewer activating a playback control, the widget may display an initial video frame and/or a title, and will then play the video once the user activates the play or fast forward control. Controls may be provided to select which video from the playlist is to be played. Optionally, the widget will automatically play the videos in the playlist in the order specified by the user that defined the playlist.

At state 8, the user may also activate a control to initiate the sending of content to a specified destination (e.g., to a phone, to a webpage (e.g., a Facebook® profile page) or to an email mail box of another). For example, the user may click on a 'Send to Phone' button, which causes the widget to transmit a request to the messaging system to deliver the content to the specified destination. The system will then bill for the sending of the video. For example, the sender may be billed (e.g., by having the charge added to the sender's phone bill, by charging the sender's credit card, by sending a bill to the sender, or otherwise), or, if an advertiser is sponsoring the sending of the video, then the advertiser is billed for the sending of the video. All example messaging process that can be utilized is described in greater detail elsewhere herein.

Optionally, widget code generated as described elsewhere herein further includes an identifier, as a site specific identifier (e.g., a unique ID), which enables actions and transactions performed via the widget on a specific site (e.g., a Web site) to be tracked. For example, the widget optionally sends some or all of the following types of information to the management system in association with the site specific identifier (also referred to as an affiliate code): an indication each time the widget is launched/loaded (e.g., based on page refreshes) and/or the number of times the widget has been launched/loaded since the last time the widget provided such information to the system, each time a video is played (optionally with an indication as to which video is played) and/or the number of times a video has been played (optionally with an indication as to which videos have been played) since the last time the widget provided such information to the system, each time a video is sent to a mobile phone and/or other destination (optionally with an indication as to which video is being sent) and/or the number of times each video has been sent (optionally with an indication as to which videos have been sent) since the last time the widget provided such information to the system, etc. The foregoing information can be received, stored and tracked by the messaging system. Optionally, the foregoing information is used to track and compensate the distribution channel (e.g., the hosting website, etc.) where the widget is posted. The user may be provided with or have multiple widgets that appear the same and that include the same playlists, but where each has a different affiliate code included therein.

For example, a user can specify a playlist and/or select a playlist specified by the system, the system operator, or another user (e.g., a Holiday playlist). The messaging system then generates the corresponding widget, including an affiliate code as similarly described above. Optionally, the user request for the widget is made via the affiliate website and code generation includes the affiliate code assigned to the affiliate in the widget code. The user posts the widget on a Web page (e.g., a social networking Webpage, such as a Facebook® page). Then the messaging system tracks how often the widget is loaded at the Webpage, the number of times each video is played via the widget at that webpage, the number of times each clip is sent to a phone using that widget, etc. The messaging system operator or other entity can then compensate the hosting website (e.g., pay money or provide other resources) based on such activity/transactions (e.g., a revenue share, specified as a dollar and/or percentage, on the amount of traffic and/or transactions credited to the website, based on the posting of the widget on a distribution channel). The messaging system optionally also generates reports including some or all of the foregoing information received from the widget and provides the report to one or more recipients (e.g., to the hosting website, an artist included in a playlist video, an entity (e.g., a movie, television, or music studio/distributer) that provided the video, etc.). The report can be in the form of an electronic file (e.g., a PDF file, a word processing document, etc.) or a physical document.

By way of example, the affiliate code is assigned as follows:

1) where the person/entity that the affiliate code is issued to is an 'author' associated with the management system (an entity that has the royalty or ownership right for a given piece of content, such as a video clip), the affiliate code is optionally generated based on their author id (e.g., which may be a number, such as in a range of 0-1000 or other range). For example, if an amateur filmmaker provides a video clip, the system creates a record describing the filmmaker and assigns them an author_id. Thereafter, when the filmmaker submit a video clip it is optionally assigned the same author_id. The author can similarly be a business development partner, such as a movie studio, that provides the video clip. The messaging system operator can also be an. author (e.g., for internally generated videos or for videos it otherwise owns). Optionally, an entity can be assigned more than one author ID.

2) Optionally, a database list (e.g., a hash_cache) may be used that includes an affiliate code assignment for a given site or sites. An operator (e.g., a marketing person) 'assigns' a code to the affiliate. For example, amateur filmmakers may be assigned affiliate codes beginning within a first range (e.g., beginning at 30,000 and ending at 50,000), business development partners may be assigned affiliate codes beginning within a second range (e.g., beginning at 50,001 and ending at 100,000), etc.

The affiliate code is then attached to the widget via the 'embed code' which is the chunk of text used to place the widget on a web site. Optionally, multiple websites can be assigned the same affiliate code, and therefore the same embed code. Optionally, each website is assigned a different affiliate code, and therefore a different embed code.

Thus, using the widget in conjunction with an affiliate code, activity monitoring over a large number of website is provided using distributed widgets, thereby reducing the processing power and network bandwidth that would be needed if the activity monitoring were simply performed by a centralized system.

An example embodiment of the client messaging application will now be further described.

As similarly discussed above, the messaging application (e.g., messaging widget) can be configured to play multiple pieces of content listed in a playlist, optionally all from the same content source or from different content sources, and/or specifically related to a certain genre (e.g., manga, reality, film noir, war, etc.) or theme (pets, beach, party, themes of content, sports, fashion, travel, finance, food, restaurants, music, books, magazine, pets, etc.).

In an example embodiment, the messaging application can be utilized by a user to register for services offered by the messaging system. Once a user has registered, the system generates and assigns a unique identification number ("ID") to the user and adds the ID to the system's user database. Thereafter, the widget that is embedded by this user is tied to the user via a user identifier.

Data (e.g., XML data or HTTP POST data) is passed between the widget and a registration engine associated with the messaging system. In an example process, when a user wants to send a piece of content, the widget asks for the sender's mobile phone number and/or email address. Optionally, prior to sending the content to the recipient, the messaging system transmits to the sender an authentication message to the sender (e.g., via an email or text message to which the sender is send a reply in order to authenticate the request for the content transmission). When the authentication has occurred, a profile is created for the sender and/or the receiver within the messaging system user database. A positive authenticated response causes the sender to be a registered.

The system enables users to select, sort, and create a playlist of their preferred pieces of content. The content can then be downloaded or streamed to the widget. Once the playlist/group of content has been created, the system generates a new HTML embed code for the user via which the user can embed a widget (e.g., such as that illustrated in FIGS. 9A-B) which displays and/or accesses the user's playlist. By way of example, the widget can be embedded in a webpage (e.g., the user's blog, social network pages, personal website page, etc.). If the content includes a piece of content provided by an advertiser, when the widget is embedded that has a playlist incorporating an advertiser sponsored video or otherwise includes an advertisement, optionally a notification is sent to and stored in the system's advertiser database and the advertiser's campaign account is updated. Optionally, the advertiser in charged a fee for the inclusion of advertiser content or advertiser sponsored content in the widget display and/or is charged when such content is viewed/played.

The widget is configured to be able to send mobile and Internet messages (which may be delivered in MMS message format) containing a variety of types of media content, such as pictures, text and/or videos, using, for example, the messaging process discussed elsewhere herein in greater detail. In this capacity, users/consumers who interact with the widget can view the content playing within a widget and choose to send it to their mobile phone (e.g., as an MMS message) or email address, or to someone else's mobile phone/email address. To do so, a sender enters the recipient's mobile phone number or email address to begin the content delivery process to the recipient.

If a user has registered for services provided by the messaging system, the system will transmit video/text messages to the user's messaging application, as well as send notifications regarding video/text messages that have been sent to the user's mobile phone. When a piece of content has been sent to the user' mobile phone, the system searches the user database to determine if the recipient phone number is matched to an ID (and widget) and if so, the system delivers a notification to the user's widget. If the piece of content is sent to the user's widget (e.g., using Internet Protocol), a notification appears within the widget that a piece of content has been received.

Figure 12:
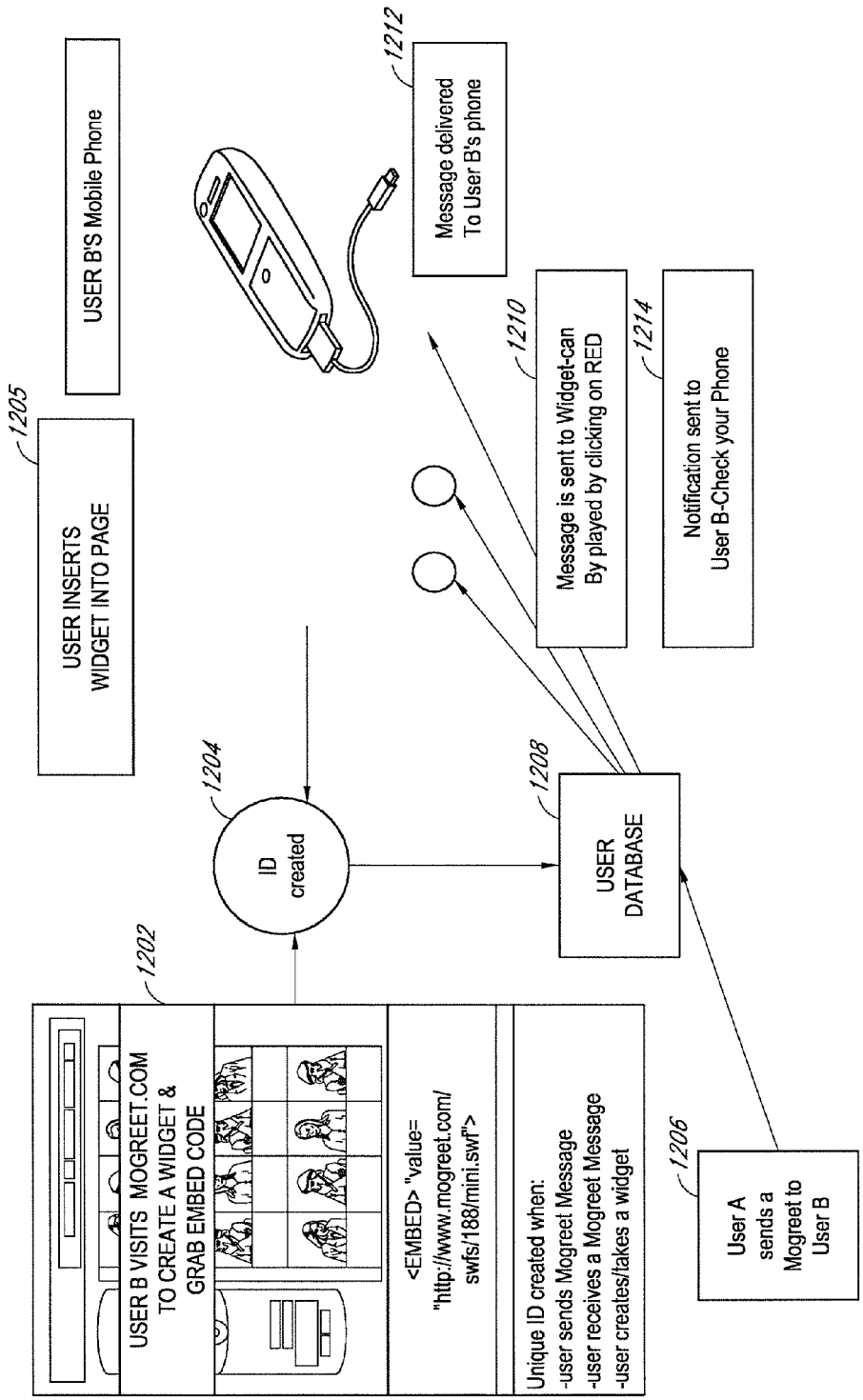
FIG. 12 illustrates an example system architecture and process.

FIG. 12 illustrates an example notification process.

At state 1202, User A visits a web site hosted by or associated with the messaging system. User A assembles a playlist, optionally by selecting videos presented via the web site. The user activates a "create/download widget" control and the system generates customized widget including a unique identifier (ID) 1204 associated with the user and/or the playlist and downloads the code to the User B's terminal (e.g., personal computer, IP television, etc.). The unique identifier is stored in the system database 1208. At state 1205, User A then embeds the customized widget code on one or more web pages, blogs, etc.

At state 1206, User A sends a video/text message to User B using the widget (e.g., by providing User B's mobile phone number and selecting a "send" control). The user database 1208 is accessed to determine the widget identifier for User B's widget. In addition, the database is updated to record the transmission so that User A and/or a sponsoring advertiser is billed or charged for the transmission.

At state 1210, the message is transmitted over the Internet to User B's widget, and User B can play the message, including the playlist, via the widget. At state 1212, the video/text message is transmitted to User B's mobile phone. A notification regarding the transmission of the message to User B's widget, email address, ad/or other address. The notification informs User B that a video/text message has been transmitted to User B's mobile phone. User B can then play back the video/text message via the mobile phone.

As previously discussed, a billing mechanism is provided, whereby a given piece of content sent from the widget operates through the billing mechanism and is optionally billed to the sender of the content's mobile phone bill. Additionally, if the piece of content is an advertisement, then a receipt that the content has been sent is sent to the company's advertiser database, whereby an update to an advertiser's campaign is made.

A given piece of content that is sent via the widget contains unique pieces of data (the sender, the receiver, the widget it was sent from) and this information is centrally stored within messaging system database. Optionally, for a given piece of content sent by a given widget, the user that placed the widget (as determined by the user identifier included in the widget) receives a financial compensation for providing the lead that enabled the transaction to occur. The financial compensation may be provided directly by the messaging system operator, or an advertiser sponsoring the content may provide the financial compensation to the user (optionally, via the messaging system operator).

With respect to the widget "skin" (e.g., physical appearance), a default skin may be assigned to the widget. However, the user or the system can optionally change the skin. For example, if the user registers for the messaging system service, the system optionally provides the user with the ability to choose the widget skin of their preference from a menu of pre-designed widget templates. Optionally, the system may enable the user to customize a widget skin (e.g., change the color, pattern, etc.) or design a skin. Optionally, an advertiser may "sponsor" a skin (where the advertiser pays the system operator and/or user a fee when the skin is used). If a user selects such a sponsored skin, a notification is sent to the system's advertiser database and a billing record is added to the respective advertiser's campaign.

By way of further example, when a user embeds a widget on a webpage, the widget sends a request to the messaging system requesting that an updated skin, if available, is to be downloaded for display as the widget skin. Optionally, the messaging system dynamically changes the displayed skin for all online widgets as desired, or selectively. For example, the skin for a given widget may be updated based on the genre of content being displayed therein (e.g., a sport-themed skin for sport content, a romantic these for romance genre, etc.).

Referring now to FIG. 8A, an example messaging application in the form of a widget is illustrated. In this example, the playlist includes a single video. The selected video (or a frame thereof) and text is displayed in the widget messaging application. A "send to phone" control is provided. When the "send to phone" control is activated, an address/information form appears (optionally to one side of the user interface displaying the video, optionally instead, replacing the user interface displaying the video), as illustrated in FIG. 8B.

In this example, a descriptive name of the video ("Guy running late") and the price to the user (which can be $0.00) are displayed. In addition, "To", "From", and "Message" fields are provided via which the user can enter, respectively, the recipient phone number, the user's origination phone number, and a text message (if any). The entered information is transmitted to the messaging system and stored therein. A "Send" control is provided, which when activated, causes, at least in part, the messaging system to initiate the transmission of the video-based message to the recipient's phone associated with the destination phone address. A "Cancel" control is provided, which when activated, causes the address/information form to be cleared and/or to be removed from the display.

Figure 9B:
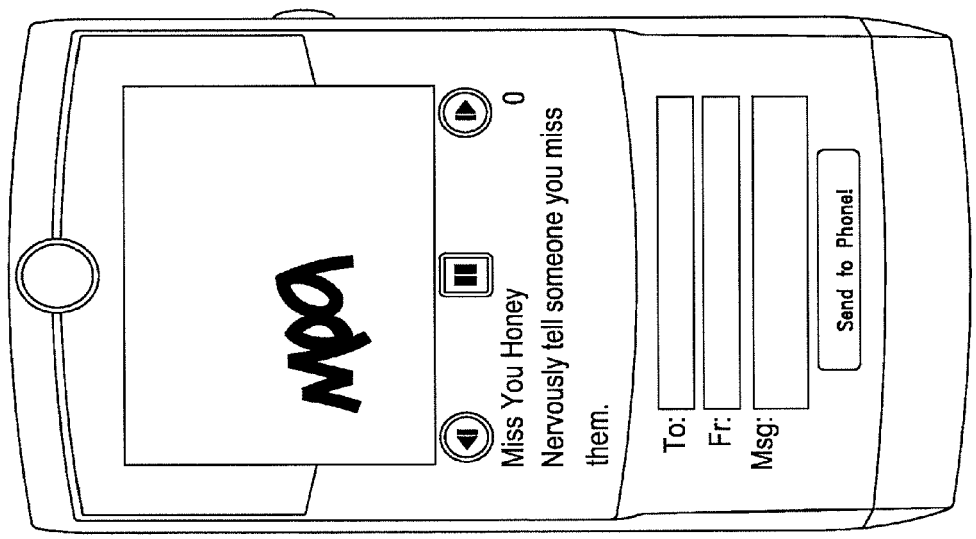

FIGS. 9A-B illustrate an example messaging application (in the form of a widget) displaying a customized playlist with two different items of content ("Bad Hair Cut" and "Miss you Honey"). Optionally, multiple videos can be displayed at the same time, or a single video is displayed, and the user may scroll the widget from one video to another video (e.g., via scroll arrows or otherwise). Playback controls may be provided via the widget user interface (e.g., play, pause, rewind, fast forward, increase/decrease volume, etc.). The user interface, as illustrated in FIG. 9B, includes "To", "From", and "Message" fields as similarly described above with respect to FIG. 8B. A "Send" control is provided, which when activated, causes, at least in part, the messaging system to initiate the transmission of the video-based message to the recipient's phone associated with the destination phone address.

Figure 10:
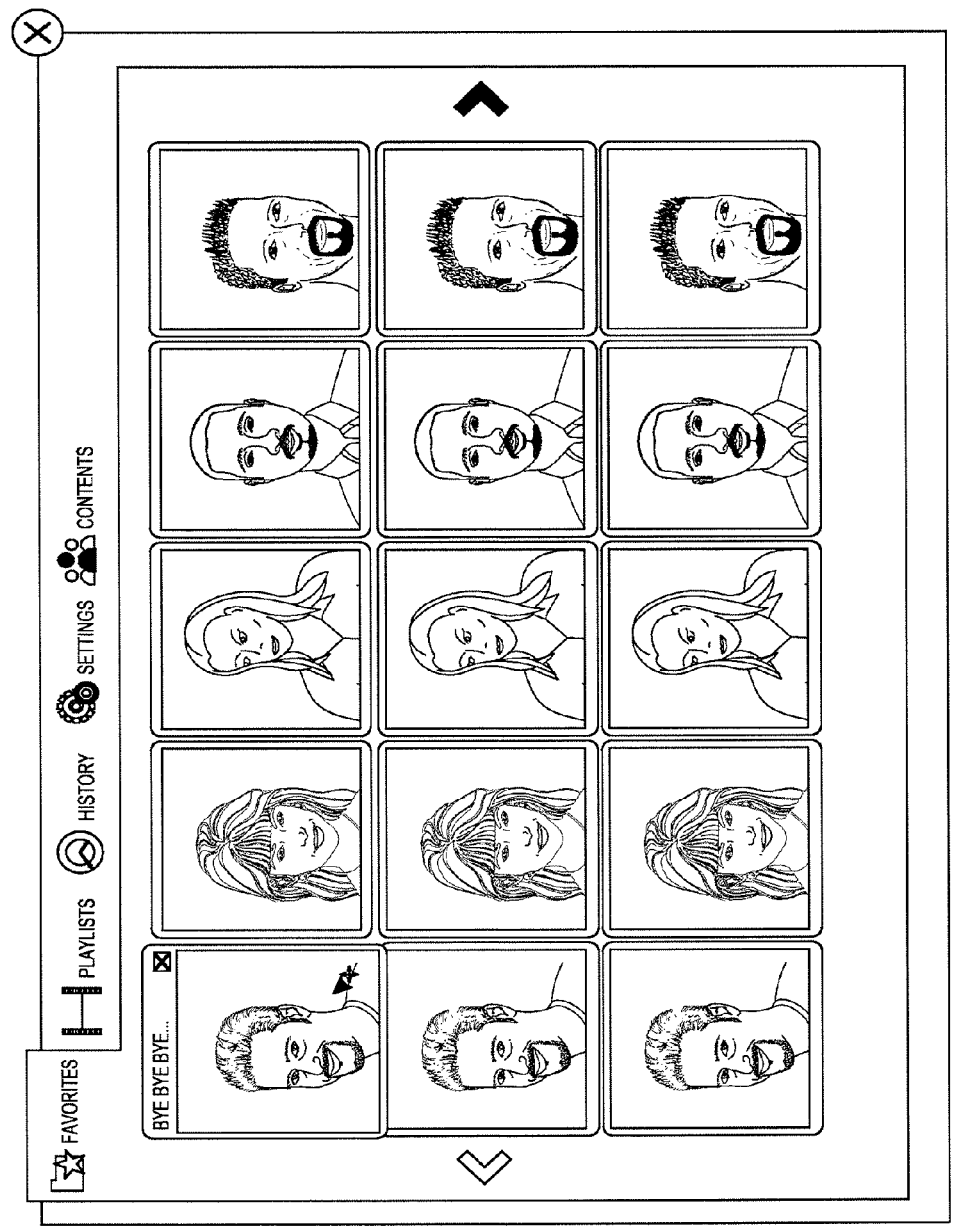
Figure 11:
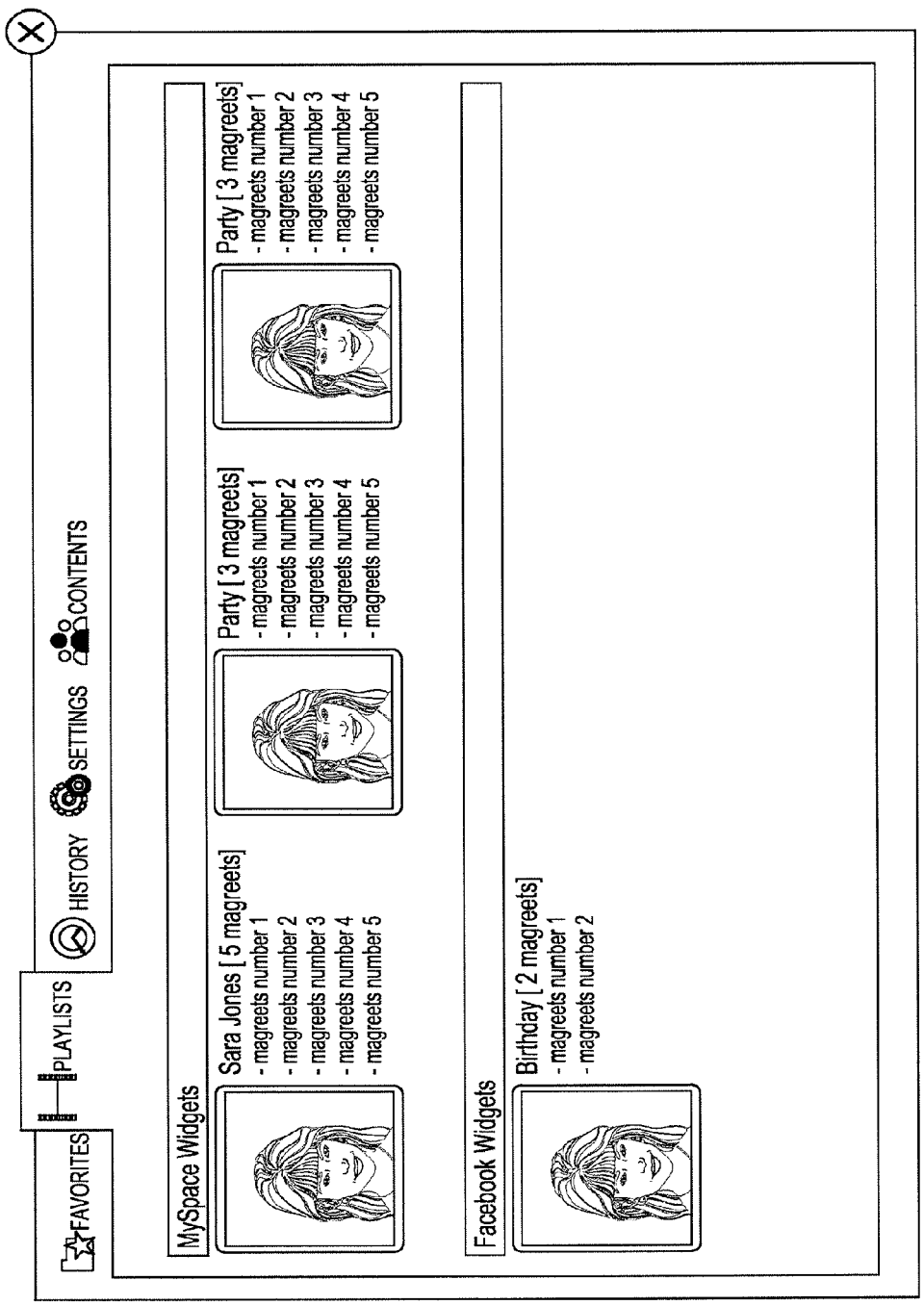

FIGS. 10 and 11 illustrate example user interfaces for defining a playlist. Referring to FIG. 10, a selection of video clips is displayed. In this example, the clips are a selection of clips previously indicated by the user as being favorite clips. For example, the user may indicate a clip is a favorite clip by explicitly labeling it as such or by use. Other example grouping of clips can include clips in other playlists defined by the user (or others), other clips previously sent by the user, or clips arranged by theme and/or genre.

A clip may be displayed using a "frozen" clip frame which can be played by clicking on the frame or the clip may be continuously playing, with an optional pause control provided which the user can activate to pause a selected clip or all of the displayed clips. In this example, a user can define a playlist by dragging and dropping a clip onto a playlist area in the order in which the user wants them to appear. Optionally, the user can rearrange a playlist by dragging and dropping video clips within the playlist area.

FIG. 11 illustrates an example user interface providing the user's library of playlists. The user interface enables the user to define categories/folders of playlists. In this example, the user has defined playlist category for a MySpace( ) page and a playlist category for a Facebook0 page. Other categories can be defined as well. The user can name, copy, delete, move, and rearrange the displayed playlists. The user can assign user names to the playlist clips.

The provision of advertisements via the messaging system will now be discussed in greater detail. In an example embodiment, the messaging system provides a user interface via which an advertiser can select a category or theme of message, or select from a library of pre-created/defined themes and/or categories, such as those described above, to attach their advertisement thereto. As previously discussed, these categories may include specific titles, themes, genres, actors and/or participants and may be further sub-classified by customer criteria including geographic area, demographic information (e.g., age, nationality, gender, etc.), preferences, and messaging history.

After an advertiser has selected or created one or more messages, (which can be in the form of a selected video clip optionally with the advertiser's logo, text, images, audio track, etc.) and generated profile information for the desired recipient pool (e.g., by defining the desired demographics, interests, area code, and/or preferences of the pool), the system designates the message(s) as reserved for the respective advertiser for a defined duration and/or the defined pool. The designation is stored in the message and/or advertiser databases.

Optionally, an advertiser can elect to sponsor a playlist of video clips defined by the advertiser, the messaging system operator, a user, and/or other entity.

As similarly described above, when a user/consumer chooses to send a video message (e.g., to another user), the user selects a video message from a pre-created set of messages, modifies a pre-created message and/or creates a message (e.g., using a selected pre-created video clip, images, text and/or a user-created video clip, images, text, etc.). The user can utilize the system search engine to identify and locate suitable messages. For example, the user can specify genre, category, cost, and the search engine locates matching messages and/or videos.

The user further provides a unique message recipient identifier/address (i.e. phone number, email address, etc.) to whom the message is to be sent. Example methods and systems for defining and sending video messages are described elsewhere herein.

The system interprets the unique message recipient identifier/address information and searches for a match between the unique recipient identifier and an existing identifier stored in a user profile housed in the system's database. If a matching profile is not found, a profile is created that contains information identifying the content of the message being sent, the recipient address, and/or the profile or profile identifier of the person sending the message.

The system then queries the system database(s) to identify messages having designated advertisers to determine if an advertisement is to be added to the message being sent by the user. If the message corresponds to a message that has been selected/reserved by an advertiser, and/or if the message recipient meets the advertiser specified desired recipient pool, the message is assembled with the respective advertisement, and the advertisement, in conjunction with the other message content, is delivered to the recipient at the corresponding recipient address.

The advertiser may be charged a flat fee for sending messages for a specified period of time, a flat fee for sending up to a specified number of messages (optionally within a specified period of time), or may be charged a per message fee. The advertiser database tracks the sending of advertiser sponsored messages for billing purposes. Advertisement spots for video messages may be auctioned off to advertisers based at least in part on the strength of the match between the demographic profile desired/specified by the advertiser and the profile of the sender and/or recipient.

Figure 13:
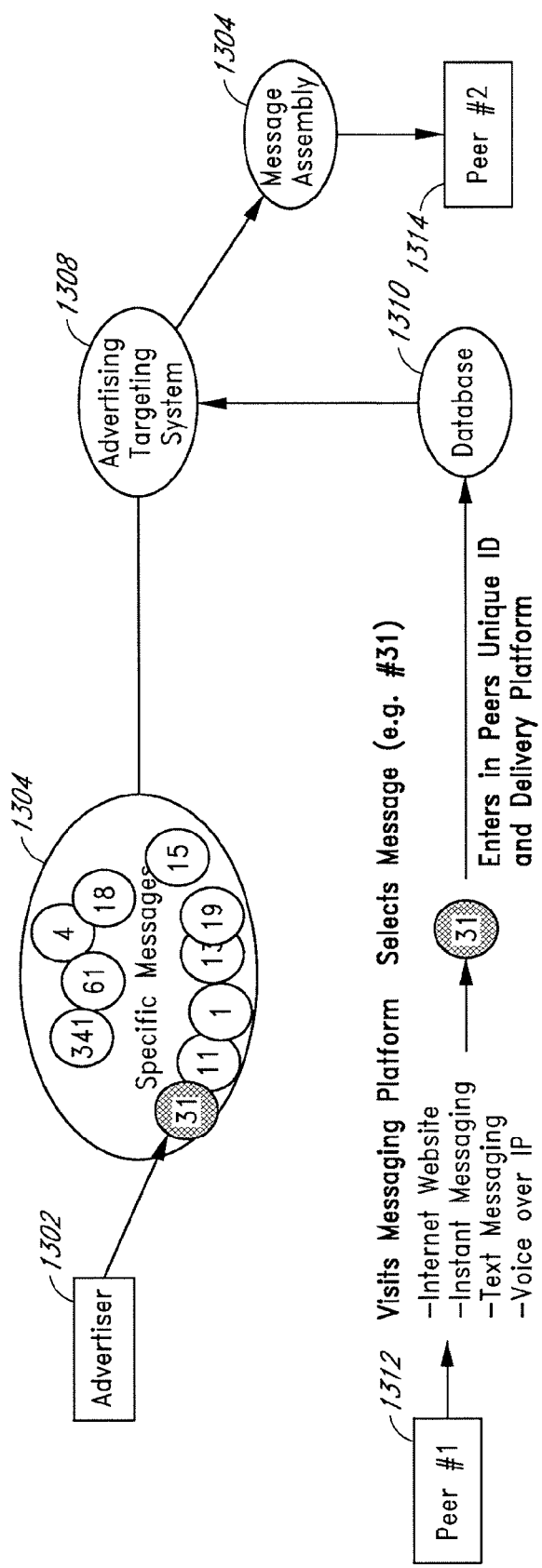
FIG. 13 illustrates another example messaging system and process.

FIG. 13 illustrates an example messaging system (including, in this example, an advertising targeting system 1306) and process. An advertiser 1302 selects a message (Message 31 in this example) to sponsor via one or more user interfaces hosted by the messaging system and accessed via an advertiser terminal (e.g., a processor based system such as a computer), and optionally specifies a sponsorship time period and/or specifies a target recipient profile. The messaging system stores an indication that the advertiser (as identified by a unique advertiser identifier) is sponsoring the message, the sponsorship time period, and the target recipient profile (if specified) in a system database.

A user 1312 (Peer #1) accesses, via a user terminal, a messaging user interface hosted by or in communication with the messaging system (e.g., Web pages hosted by the messaging system, using an instant messaging user interface, using a text messaging user interface (e.g., SMS messaging interface), using a Voice over Internet Protocol user interface, or other interface). Peer #1 selects Message 31 and indicates that Message 31 is to be sent to a second user 1314 (Peer #2). Peer #1 enters or otherwise provides a unique identifier (which may be in the form of a destination address, such as a phone number or email address) associated with Peer 2.

The system automatically and dynamically determines the delivery platform to be used (e.g., WAP, MMS, etc.), optionally based, for example, on whether the campaign is premium (charged to the phone bill) or ad supported. Other factors that the system optionally considers in determining the delivery platform to be used includes some are all of the following: the identity/capabilities of the carrier of the sender; the identity/capabilities of the carrier of the recipient; the capabilities of the recipient handset; the current load; the relative cost, etc.

A database lookup of database 1310 is performed using the unique recipient identifier (phone number) to determine whether a profile exists in the database for the recipient, and if so, locates one or more identifiers/addresses associated with Peer #2 (e.g., mobile phone address, messaging application identifier, etc.). If a profile does not exist, one is generated by the targeting system 1306 or other system, including a record of who sent the recipient the message (Peer #1 in this instance), when the message was sent, how the message was sent (e.g., email, SMS, MMS, etc), the content of the message (optionally including one or more tags assigned to the message or a portion thereof by users, the system operator), the message creator (e.g., the creator of a video clip included in the message), the name, genre, and/or category of the message (and/or a video clip included therein), whether the message was sponsored by the advertiser or paid for by the sender, etc. Optionally, to further enhance privacy, the content of a given message is stored only as needed to process the message, and the content is deleted from memory once the message is no longer active. Optionally, the content of the message is automatically deleted after a specified period of time.

The advertising targeting system 1310 assembles the message (includes user and/or advertiser selected and/or provided video, images, text, audio track, etc.) at state 1308, and transmits the message to Peer #2 at the corresponding Peer #2 address. The message can then be accessed by Peer #2.

While certain of the foregoing examples discuss, for illustrative purposed, the sending of video greetings sent to one user by another, other forms of communications and communication initiations can be used.

For example, the messaging system can host a user interface accessible by users via their browsers or other messaging application via which a user can specify a subject of interest on which they want to receive notifications. For example, the user can specify one or more of: a specific person (e.g., an actor, a musician, a celebrity, a politician, etc.), a title associated with a person (e.g., President of the United States), a musical group, a sports team, a political body (e.g., Congress), a vehicle, a city, a state, an item of natural geography (e.g., oceans generally, or a specific ocean by name), a weather condition, etc. By way of still further example, the content types optionally include "general news" (e.g., for general news items that could appear, such as municipal news, political news, etc.), traffic alerts, financial alerts (e.g., for changes in more than a certain dollar value of percentage with respect to one or more stocks, when mortgage rates go down, etc.), celebrity gossip (e.g., which optionally might not be triggered by a user setting up an alert for a specific celebrity, but by a news publication/organization deciding an item is celebrity gossip and triggering the alert to their customers), religious and spiritual alerts (e.g., daily, weekly passage of the bible, inspirational quotes, etc.), and so on.

The user interface optionally further includes fields/controls via which the user can specify the media-type that is to be transmitted to the user (e.g., one or more of videos, audio tracks, photographs, text, etc.) and any limitation on format (e.g., where the user can specify than only videos that are MPEG, AVI, or Quicktime® are to be transmitted) and/or size (e.g., only video files of less than a specified size are to be transmitted). The user can optionally also specify the notification trigger (e.g., a time period or whenever new relevant content is available) via the user interface. For example, the user can specify that whenever there is a new video related to the specified subject, the video is to be sent to the user at a user specified address or addresses.

Then when the messaging system receives an indication (e.g., from an internal search/monitoring system or from a third party system) that a new video related to the specified subject, the messaging system transmits or initiates the transmission of the new video to the user. In addition or instead, the user can specify a frequency at which such notifications are to be provided (e.g., hourly, once a day, once a week, monthly, etc.).

As similarly discussed above with respect to video greeting transmissions, the user may be charged a specified fee each time the user receives a notification (e.g., a video notification) unless the notification is designated as being free to the user, such as when paid for by an advertiser or other sponsor. Optionally, the user may be a subscriber, wherein the user receives a fixed number or unlimited number of video messages for a flat rate, or as part of the user's overall service plan (e.g., phone service plan).

If the user is not on a message subscription plan and the video is not eligible for a free transmission, optionally the system sends an opt-in message (e.g., a message, such as an SMS message, sent to the user's mobile phone). The opt-in message requests the user to confirm that the user wants to receive a message (or multiple messages) for a specified fee (e.g., which will be charged to the user's phone bill). The message may ask the user to transmit a reply confirmation message so as to authenticate the message transmission request and to authorize the associate message charge.

Optionally, the system waits up to a predetermined amount of time (e.g., 1 day, 2 days, a week, 10 days, or other amount of time) for a confirmation message to be received (e.g., via an SMS message). If a response is received within the specified amount of time, the message transmission will occur. If a response is not received within the specified amount of time, the message request is marked as canceled, a log failure for the message is recorded, and the message is removed from the message caches.

If the user is approved for the campaign, the user's opt-in is stored for later reuse. For example, once a user has opted in for a specific campaign, that information is retained in the system database. Then the next time the user ask to receive a video notification via the system, the system first determines whether the opt-in has already occurred, and is still current (e.g., where the opt-in is set to automatically expire after a specified period, such as 6 months). If the opt-in is current for that user on that campaign, the authentication process is skipped, making the customer experience better and faster.

While certain illustrative example embodiments are described herein, the above description of the embodiments is not to be construed as limiting the invention.

What is claimed is:

1. A method of transmitting video messages to a mobile phone, the method comprising:
    receiving over a network at a message management system a request from a user that a video message be sent to a recipient mobile phone;
    transmitting an authorization request message to a mobile phone associated with the user, wherein the user needs to provide a user authorization response in order for the video message to be sent to the recipient;
    at least partly in response to receiving an authorization response from the user, initiating the transmission of the video message to the recipient mobile phone;
    determining whether the recipient mobile phone is capable of receiving an MMS (Multimedia Messaging Service) message;
    when the recipient mobile phone is capable of receiving an MMS message, having the video message delivered to the recipient mobile phone via an MMS message; and
    when the recipient mobile phone is not capable of receiving an MMS message, having access to the video message provided to the recipient mobile phone via a SMS (Short Message Service) WAP (Wireless Application Protocol) push message,
    wherein the SMS WAP push message includes an option of connecting to a specified URL (Uniform Resource Locator) via a recipient mobile phone browser to access the video message.

2. The method as defined in claim 1, wherein the authorization request message is an SMS (Short Message Service) message.

3. The method as defined in claim 1, wherein the authorization response is provided via an SMS (Short Message Service) message.

4. The method as defined in claim 1, the method further comprising:
    determining whether the recipient mobile phone is capable of receiving an MMS (Multimedia Messaging Service) message;
    when the recipient mobile phone is capable of receiving an MMS message, having the video message delivered to the recipient mobile phone via an MMS message; and
    when the recipient mobile phone is not capable of receiving an MMS message, having access to the video message provided to the recipient mobile phone via a SMS (Short Message Service) WAP (Wireless Application Protocol) push message.

5. The method as defined in claim 1, the method further comprising:
    determining whether the recipient mobile phone is capable of receiving an MMS (Multimedia Messaging Service) message;
    when the recipient mobile phone is capable of receiving an MMS message, having the video message delivered to the recipient mobile phone via an MMS message; and
    when the recipient mobile phone is not capable of receiving an MMS message, having access to the video message provided to the recipient mobile phone via a SMS (Short Message Service) WAP (Wireless Application Protocol) push message,
    wherein when the SMS WAP push message is to be used, a corresponding WAP push object is created and the WAP push object is transmitted to a gateway for forwarding to the recipient mobile phone carrier.

6. The method as defined in claim 1, wherein the video message is delivered using deferred MMS delivery.

7. The method as defined in claim 1, the method further comprising:
    receiving from the user a request that a second message be sent;
    determining whether the user had previously provided authorization for at least one other message to be sent in response to at least one authorization notification; and
    at least partly in response to determining the user had previously provided authorization for at least one other message to be sent in response to at least one authorization notification, initiating transmission of the second message without sending another authorization notification to the user's telephonic device.

8. The method as defined in claim 1, the method further comprising sending another notification request authorizing transmission of the second message to the user's telephonic device at least partly in response to determining the user had not, within a specified period of preceding time, provided authorization for at least one message to be sent in response to at least one authorization notification.

9. The method as defined in claim 1, the method further comprising:
    determining whether the user has a subscription for the sending of video messages; and
    determining whether a third party has sponsored the sending of the video messages.

10. The method as defined in claim 1, wherein the recipient is the user.

11. The method as defined in claim 1, wherein the user is billed for the video included in the video message transmission via a carrier associated with user mobile phone.

* * * * *